(12) United States Patent
Suzuki et al.

(10) Patent No.: US 9,132,584 B2
(45) Date of Patent: Sep. 15, 2015

(54) POLYPROPYLENE MOLDED ARTICLE AND METHOD FOR MANUFACTURING THE SAME

(71) Applicant: Panasonic Corporation, Osaka (JP)

(72) Inventors: Motohiro Suzuki, Osaka (JP); Hironobu Machida, Nara (JP); Hiromu Saito, Tokyo (JP); Tsubasa Hosoi, Kanagawa (JP); Akira Yanagida, Saitama (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/525,127

(22) Filed: Oct. 27, 2014

(65) Prior Publication Data
US 2015/0119543 A1    Apr. 30, 2015

(30) Foreign Application Priority Data

Oct. 30, 2013  (JP) .................................. 2013-224923
Jul. 11, 2014  (JP) .................................. 2014-143232

(51) Int. Cl.
| C08L 23/12 | (2006.01) |
| B29C 55/02 | (2006.01) |
| B29C 55/18 | (2006.01) |
| C08F 110/06 | (2006.01) |

(Continued)

(52) U.S. Cl.
CPC .............. *B29C 55/18* (2013.01); *B29C 55/005* (2013.01); *B29C 55/065* (2013.01); *B29D 7/01* (2013.01); *C08F 110/06* (2013.01); *C08J 5/18* (2013.01); *B29C 55/02* (2013.01); *B29K 2023/12* (2013.01); *B29L 2007/00* (2013.01); *C08J 2323/12* (2013.01); *C08L 23/12* (2013.01)

(58) Field of Classification Search
CPC ....... C08L 23/12; C08F 110/06; B29C 55/02; B29C 55/065; B29C 55/18; B29D 7/01; B29K 2023/12
USPC .............................. 526/351; 264/201.1, 210.7
See application file for complete search history.

(56) References Cited

U.S. PATENT DOCUMENTS 3,271,495 A  *  9/1966  Gronholz et al. .......... 264/210.7
8,003,031 B2 *  8/2011  Lohia et al. .................... 264/146

(Continued)

FOREIGN PATENT DOCUMENTS

| EP | 2 168 997 A1 * | 3/2010 | ................. C08J 5/00 |
| WO | 2007/026832 | 3/2007 | |

(Continued)

OTHER PUBLICATIONS

Fischer, S.; Marti, O.; Diesner, T.; Rieger, B. Macromolecules 2010, 43, 5009-5015.*

(Continued)

*Primary Examiner* — Rip A Lee
(74) *Attorney, Agent, or Firm* — Wnederoth Lind & Ponack, L.L.P.

(57) ABSTRACT

A polypropylene molded article has a crystallinity degree of 48% or more by wide-angle X-ray diffraction measurement. The half width of an orientation peak in an azimuth angular distribution obtained by wide-angle X-ray diffraction measurement on the polypropylene molded article is 5.5° or less, and the long period of the polypropylene molded article obtained by small-angle X-ray scattering measurement is 12 nm or more and 16 nm or less.

6 Claims, 22 Drawing Sheets

(51) Int. Cl.
    *B29D 7/01*    (2006.01)
    *B29C 55/00*    (2006.01)
    *B29C 55/06*    (2006.01)
    *C08J 5/18*    (2006.01)
    *B29K 23/00*    (2006.01)
    *B29L 7/00*    (2006.01)

(56) References Cited

U.S. PATENT DOCUMENTS

| | | |
|---|---|---|
| 2009/0249883 A1 | 10/2009 | Hikosaka et al. |
| 2010/0063235 A1 | 3/2010 | Hikosaka et al. |
| 2011/0300364 A1 | 12/2011 | Hikosaka et al. |

FOREIGN PATENT DOCUMENTS

| | | |
|---|---|---|
| WO | 2008/108251 | 9/2008 |
| WO | 2010/084750 | 7/2010 |

OTHER PUBLICATIONS

Extended European Search Report (ESR) issued Mar. 6, 2015 for the related European Patent Application No. 14190729.5.

Stefan Fischer et al: "Small-Angle X-ray Scattering on Melt-Spun Polypropylene Fibers: Modeling and Data Reduction", Macromolecules, vol. 43, pp. 5009-5015, 2010, cited in the ESR.

Zhi-Gang Wang et al: "Phase transformation in quenched mesomorphic isotactic polypropylene", Polymer, vol. 42, pp. 7561-7566, 2001, cited in the ESR.

Zhe Ma et al: "Critical stress for drawing-induced a crystal-mesophase transition in isotactic polypropylene", Polymer, vol. 50, pp. 2706-2715, 2009, cited in the ESR.

* cited by examiner

POLYPROPYLENE MOLDED ARTICLE AND METHOD FOR MANUFACTURING THE SAME

BACKGROUND OF THE INVENTION

1. Field of the Invention

This disclosure relates to a polypropylene molded article and a method for manufacturing the polypropylene molded article.

2. Description of the Related Art

Commodity plastics such as polyethylene (PE), polypropylene (PP), polystyrene (PS), polyvinyl chloride (PVC), etc., are inexpensive and cost as little as 100 yen/kg or less. Commodity plastics are easy to mold and are light-weight since they weigh a fraction of what metals or ceramics weigh. Accordingly, commodity plastics are being widely used as materials for various household products including bags, various packaging, various containers, and sheets as well as materials for industrial parts such as auto parts and electric parts, daily commodities, sundry goods, etc.

However, commodity plastics have drawbacks such as insufficient mechanical strength. Under the current situation, commodity plastics do not have properties sufficient for materials used in various industrial products such as mechanical products, e.g., automobiles, and electric, electronic, and information-related products. The application range of commodity plastics has thus been limited.

Thus, material properties (mechanical strength etc.) of commodity plastics are desirably improved. With improved material properties, commodity plastics can be used as alternatives for engineering plastics or metal materials and the production cost of various polymer or metal industrial products and household products can be reduced.

Among commodity plastics, polypropylene which has relatively high mechanical strength is regarded as a promising material and the rate of increase in annual polypropylene production is maintained at a high level of several percent. Since monomer recycling of polypropylene is easy, perfect recycling is possible and thus generation of carbon dioxide and consumption of petroleum fuels such as oil can be reduced.

Patent Literatures 1, 2, and 3 (International Publication Nos. 2007/026832, 2008/108251, and 2010/084750) disclose a method for producing a high-molecular oriented crystal such as polypropylene with improved mechanical strength, the method including stretching a melt of a polymer at an elongational strain rate equal to or higher than the critical elongational strain rate to prepare an oriented melt and crystallizing the melt of a polymer while maintaining the state of the oriented melt.

SUMMARY OF THE INVENTION

The high-molecular oriented crystal produced by the method disclosed in Patent Literatures 1, 2, and 3 has a fracture strength of 240 MPa at maximum. This fracture strength is smaller than the fracture strength of a metal such as copper. The high-molecular oriented crystal does not have sufficient mechanical strength.

One non-limiting and exemplary embodiment provides a polypropylene molded article having mechanical strength superior to that in the related art.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

An embodiment of the disclosure includes a polypropylene molded article in which a crystallinity degree obtained by wide-angle X-ray diffraction measurement is 48% or more, a half width of an orientation peak in an azimuth angular distribution obtained by wide-angle X-ray diffraction measurement is 5.5° or less, and a long period obtained by small-angle X-ray scattering measurement is 12 nm or more and 16 nm or less.

These general and specific aspects may be implemented using a system and a method, and any combination of systems and methods.

According to the embodiment of the disclosure, a polypropylene molded article having mechanical strength superior to that in the related art can be provided.

DETAILED DESCRIPTION

The inventors of the subject application have come up with an idea of improving mechanical strength of a polypropylene molded article through the following approaches (1) to (3):
(1) Increasing crystallinity: Increasing the proportion of the crystalline phase in the polypropylene molded article (in other words, increasing the crystallinity degree)
(2) Increasing the orientation: Aligning the directions in which molecular chains in the polypropylene molded article extend (in other words, increasing the degree of orientation)
(3) Refining crystals: Reducing the size of crystals in the polypropylene molded article The reason why the mechanical strength of a polypropylene molded article is improved through the approaches (1) to (3) described above compared to the related art is described below with reference to FIG. 41.

Figure 41:
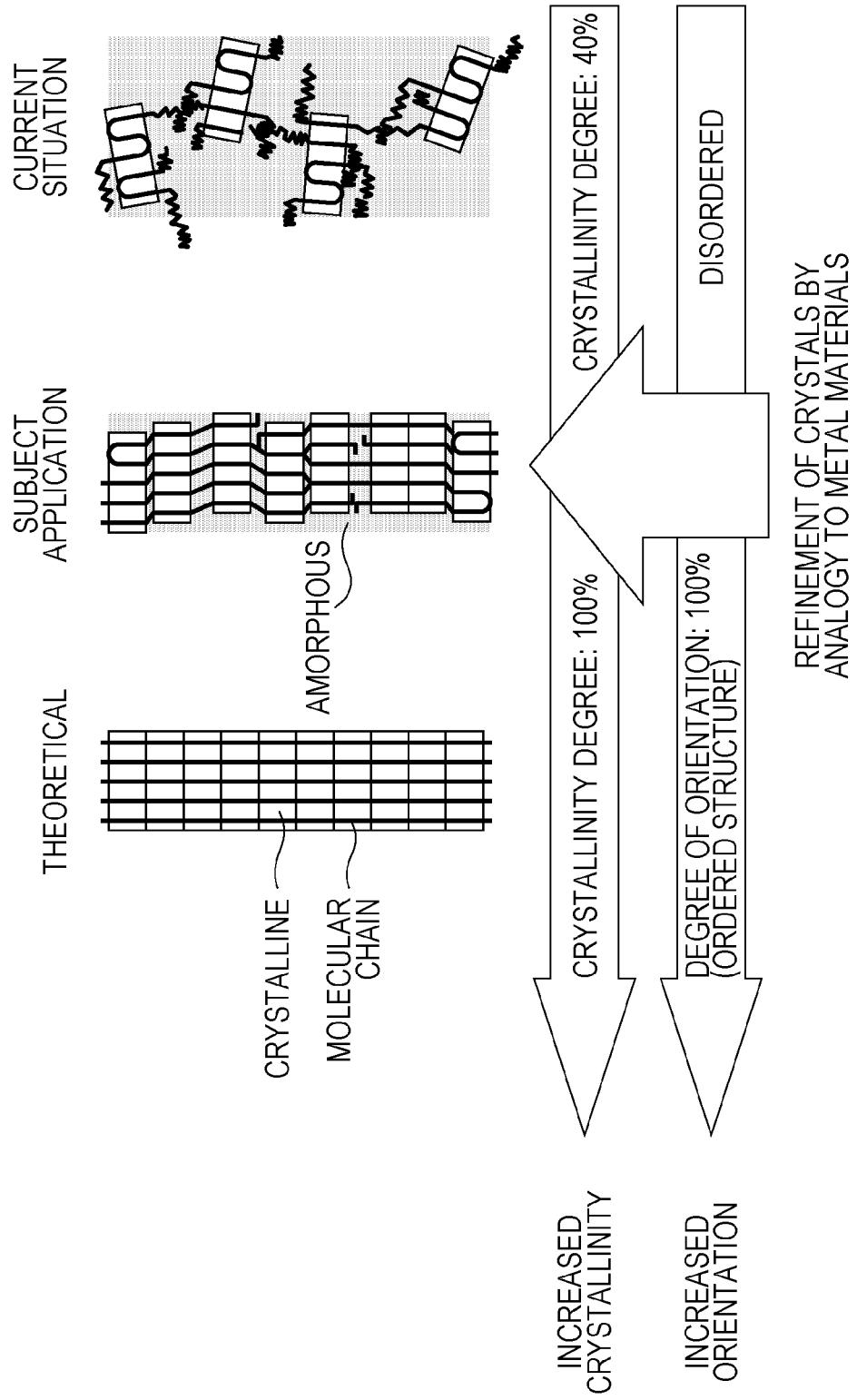
FIG. 41 is a diagram used to describe the reason why the mechanical strength of a polypropylene molded article is improved through approaches (1) to (3) conceived by the inventors of the subject application.

In a crystallized state on the left-hand side of FIG. 41 in which the crystallinity degree is 100 and the degree of orientation is 100% (in other words, perfectly ordered structure), the polypropylene exhibits a theoretical strength (in other words, the theoretical strength of the carbon-carbon single bond). In contrast, in a crystallized state of an existing polypropylene product on the right-hand side of FIG. 41, the polypropylene does not exhibit a high crystallinity degree (for example, about 40%), is in a state close to a disordered structure, and does not have high mechanical strength.

The mechanical strength of a polypropylene molded article can be made close to the theoretical strength of the polypropylene by increasing the crystallinity and orientation (approaches (1) and (2)). However, merely increasing the crystallinity degree and degree of orientation gives a brittle polypropylene molded article. The inventors have used an analogy to metal materials to investigate whether toughness can be increased by refining crystals (approach (3)).

An aluminum alloy is known to form a structure in which quasicrystals are finely dispersed in a matrix and nanoscale amorphous phases are embedded in the fine crystals when the aluminum alloy is made by quenching a melt (for example, refer to Akihisa Inoue and three others, High Strength Al-V-M (M=Fe, Co, or Ni) Alloys Containing High Volume Fraction of Nanoscale Amorphous Precipitates", Materials Transactions, JIM, Vol. 36, No. 10 (1995), pp. 1219-1228). An aluminum alloy that excels in both strength and toughness can be realized due to formation of this structure.

According to the investigations made by the inventors, it has been found that a polypropylene molded article, too, can exhibit high strength and high toughness at the same time when the crystal size is reduced. The mechanical strength of a polypropylene molded article can be increased from that achieved in the related art when the polypropylene molded article has a crystallized state illustrated in the center part of FIG. 41 in which high crystallinity, high orientation, and crystal refinement are achieved through the approaches (1) to (3) described above.

A polypropylene molded article of this disclosure achieves mechanical strength (300 MPa or more in terms of rupture strength) that could not have been achieved in the related art since higher orientation and further refinement of crystals are successfully achieved regarding (2) and (3). As a result, the polypropylene molded article of this disclosure can be used as an alternative for metal materials such as copper. It should be noted here that the rupture strength of copper materials (Japanese Industrial Standard (JIS) C1220) used in refrigerating and air-conditioning heat exchangers is 245 MPa.

The inventors have also found that a polypropylene molded article can achieve mechanical strength that could not have been achieved in the related art by increasing the orientation and refining crystals without increasing the crystallinity degree as much as that required in the related art.

The outline of the embodiments of this disclosure will now be described.

According to a polypropylene molded article according to a first aspect of this disclosure, the crystallinity degree obtained by wide-angle X-ray diffraction measurement is 48% or more, the half width of an orientation peak in an azimuth angular distribution obtained by wide-angle X-ray diffraction measurement is 5.5° or less, and the long period obtained by small-angle X-ray scattering (SAXS) measurement is 12 nm or more and 16 nm or less.

The half width of the orientation peak in the azimuth angular distribution obtained by the wide-angle X-ray diffraction measurement from the polypropylene molded article described above is 5.5° or less. This equals to 0.97 or more in terms of degree of orientation. In contrast, the degree of orientation of the polypropylene molded article of Patent Literatures described above is 0.92 at maximum. The polypropylene molded article of this disclosure has higher orientation than the related art.

The long period obtained by the SAXS measurement is 12 nm or more and 16 nm or less. The long period of the polypropylene molded article described in Patent Literatures described above is 20 nm or less at minimum and 26 nm according to an Example. Accordingly, the polypropylene molded article of this disclosure can be considered to have undergone further crystal refinement compared to the related art.

The crystallinity degree obtained in the wide-angle X-ray diffraction measurement is 48% or more. That of the polypropylene molded article described in Patent Literatures described above is 70% or more.

The polypropylene molded article of this disclosure satisfying the conditions described above achieves mechanical strength (300 MPa or more in terms of rupture strength) that could not have been achieved with the related art. The polypropylene molded article of this disclosure can thus be used as an alternative for copper, for example, since the rupture strength of the polypropylene molded article is higher than that of copper.

It can also be said that the polypropylene molded article of this disclosure can achieve the mechanical strength that could not have been achieved with the related art without increasing the crystallinity degree as much as that required in the related art.

According to a second aspect of this disclosure, in addition to the first aspect, the storage elastic modulus obtained by dynamic viscoelasticity analysis at a frequency of 10 Hz and a heatup rate of 2° C./min is larger at 120° C. than at 50° C.

According to a third aspect of this disclosure, in addition to the first or second aspect, the loss modulus obtained by dynamic viscoelasticity analysis at a frequency of 10 Hz and a heatup rate of 2° C./min monotonically increases with the increase in temperature in the range of 0° C. to 50° C.

According to a forth aspect, in addition to any one of the first to the third aspects, the tensile elastic modulus (in particular, the tensile elastic modulus at 25° C.) is 4.0 GPa or more.

A manufacturing method according to a fifth of this disclosure is a method for manufacturing a polypropylene molded article according to any one of the first to the forth aspects. The method includes a heating step of heating a polypropylene to a temperature of 200° C. or higher and 220° C. or lower to prepare a melt, a cooling step of quenching the melt of the polypropylene to 25° C. or less to form a mesophase in the polypropylene, a room-temperature stretching step of stretching the polypropylene that includes the mesophase by a stretching ratio of 2 or more and 5 or less at room temperature, and a heat stretching step of further stretching the stretched polypropylene obtained in the room-temperature stretching step by a stretching ratio of 2 or more and 5 or less in the temperature range of 100° C. or higher and 140° C. or lower.

In the manufacturing method described above, the polypropylene melt is quenched to a temperature equal to or less than the temperature zone of crystallization (in particular, 25° C. or less) in the cooling step. As a result, crystal growth in the polypropylene is suppressed and a mesophase, which is a small-size intermediate phase between crystalline and amorphous phases, occurs. Quenching may involve, for example, cooling a polypropylene from a temperature of 200° C. or higher and 220° C. or lower to a temperature equal to or less than 25° C. within 45 seconds. In the room-temperature stretching step, the degree of orientation is increased by stretching the mesophase-including polypropylene at room temperature by a stretching ratio of 2 to 5. During this process, the difference in density between crystalline portions and amorphous portions is increased. In the heat stretching step, the polypropylene is heated to a temperature of 100° C. or higher and 140° C. or lower and crystallization from the mesophase to α crystals occurs. Since the difference in density between crystalline portions and amorphous portions is increased in the room-temperature stretching step, molecular chains are easier to stretch and the stretching operation is smoothly carried out. As a result, fracture rarely occurs even when the polypropylene is further stretched by a stretching ratio of 2 to 5 in the heat stretching step and the degree of orientation can thus be further improved. Since the molecular chains are fully stretched, the molecular chains align also in amorphous portions and a rigid structure results. Accordingly, the increase in strength which could not have been achieved in the related art can be achieved even at a crystallinity degree not significantly high.

As described above, according to the method for manufacturing a polypropylene molded article according to one embodiment of the disclosure, a polypropylene molded article having mechanical strength higher than in the related art can be manufactured. The manufacturing method described above is different from the methods disclosed in Patent Literatures 1, 2, and 3 in that there is no need to retain the melt in a supercooled state or stretch the melt at an elongation strain rate equal to or more than the critical elongation strain rate. Thus, the method can be easily adapted to an industrial process.

A manufacturing method according to a sixth aspect of this disclosure is a method for manufacturing a polypropylene molded article according to any one of the first to the forth aspects. The method includes a heating step of heating a polypropylene to a temperature of 200° C. or higher and 220° C. or lower to prepare a melt, a cooling step of quenching the melt of the polypropylene to 25° C. or less to form a mesophase in the polypropylene, a heat rolling step of rolling the polypropylene that includes the mesophase while heating the polypropylene to a temperature near an endothermic peak obtained by differential scanning calorimeter (DSC) analysis, and a heat stretching step of stretching the rolled polypropylene obtained in the heat rolling step by a stretching ratio of 4 to 6 in the temperature range of 120° C. or higher and 140° C. or lower.

In the manufacturing method described above, the polypropylene melt is quenched to a temperature equal to or less than the temperature zone of crystallization (in particular, 25° C. or less) in the cooling step. As a result, crystal growth in the polypropylene is suppressed and a mesophase, which is a small-size intermediate phase between crystalline and amorphous phases, occurs. Quenching may involve, for example, cooling a polypropylene from a temperature of 200° C. or higher and 220° C. or lower to a temperature equal to or less than 25° C. within 45 seconds. In the hot-rolling step, the polypropylene that includes the mesophase is heated to a temperature near the endothermic peak (for example, within the endothermic peak temperature ±10° C.) obtained in the DSC analysis and, as a result, some of the mesophase crystallizes into α crystals. Since the polypropylene is rolled, the degree of orientation is increased and the difference in density between crystalline portions and amorphous portions is increased. In the heat stretching step, the polypropylene is heated to a temperature of 120° C. or higher and 140° C. or lower and, as a result, the rest of the mesophase crystallizes into α crystals. Since the difference in density between crystalline portions and amorphous portions is increased in the heat rolling step, molecular chains are easier to stretch and thus the stretching operation is smoothly carried out. Accordingly, fracture rarely occurs even when the polypropylene is stretched by a stretching ratio of 4 to 6 in the heat stretching step and the degree of orientation can thus be further improved. Since the molecular chains are fully stretched, the molecular chains align also in amorphous portions and a rigid structure results. Accordingly, the increase in strength which could not have been achieved in the related art can be achieved even at a crystallinity degree not significantly high.

As described above, according to the method for manufacturing a polypropylene molded article according to an embodiment of the disclosure, a polypropylene molded article having mechanical strength higher than in the related art can be manufactured. The manufacturing method described above is different from the methods disclosed in Patent Literatures 1, 2, and 3 in that there is no need to retain the melt in a supercooled state or stretch the melt at an elongation strain rate equal to or more than the critical elongation strain rate. Thus, the method can be easily adapted to an industrial process.

In the specification of the subject application, a "polypropylene molded article" refers to any of polypropylene products with various shapes, e.g., a polypropylene film having a thin film shape, a polypropylene sheet, and a polypropylene container.

EXAMPLES

Prototype polypropylene molded articles according to one embodiment of the disclosure were actually manufactured (Examples 1 to 16). The mechanical strength of the polypropylene molded articles was compared with that of polypropylene molded articles of Comparative Examples (Comparative Examples 1 to 18) and the results are described below.

Example 1

Figure 42:
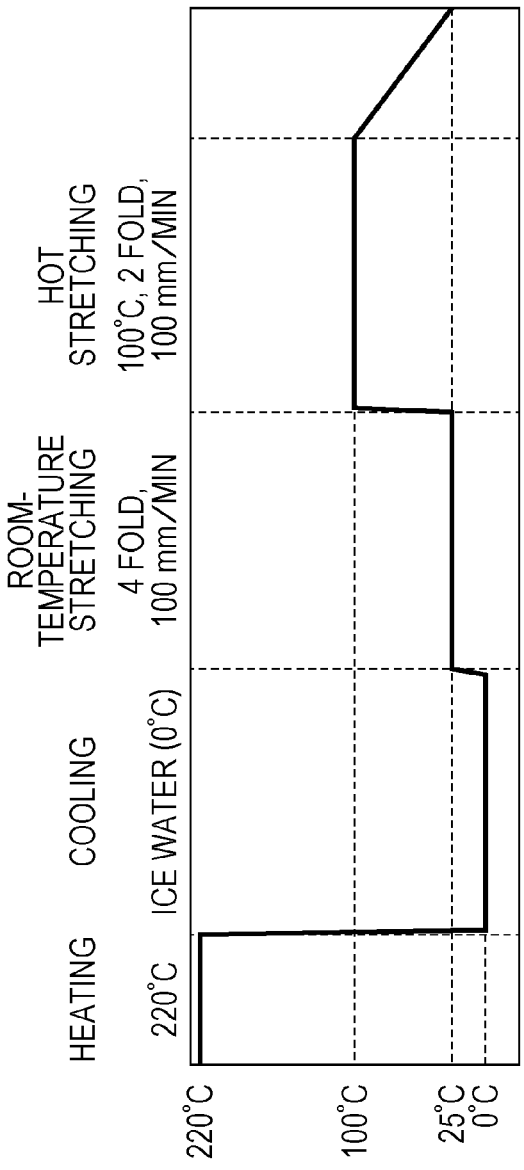
FIG. 42 is a diagram showing a flow (relationship between time and temperature) of a manufacturing process of Example 1.

A polypropylene molded article was manufactured by a manufacturing method that included the following steps. The flow (the relationship between time and temperature) of the manufacturing method of this example is as illustrated in FIG. 42.

Heating Step:

A sheet having a thickness of 300 μm formed of isotactic polypropylene beads (trade name: H-700) produced by Prime Polymer Co., Ltd., was interposed between two cover glasses and placed on a 220° C. hot plate to be heated and melted (preparation of a melt).

Cooling Step:

The melt of the polypropylene (polypropylene melt) as interposed between the cover glasses was immersed in ice water at 0° C. to conduct quenching.

Room-Temperature Stretching Step:

A strip of sheet was cut from the sample that had solidified by quenching and the sheet was retained in a stretching machine at a chuck-to-chuck distance of 10 mm. While retaining the temperature inside the stretching machine at 25° C., room-temperature stretching was conducted at a stretching rate of 100 mm/min until the chuck-to-chuck distance was four times greater than the initial distance (in other words, 40 mm).

Heat Stretching Step:

Only a stretched portion was cut out from the sheet after the room-temperature stretching step and the cut-out sample was retained in a stretching machine at a chuck-to-chuck distance of 10 mm. The temperature inside the stretching machine was increased to 100° C. and heat stretching was conducted at a stretching rate of 100 mm/min until the chuck-to-chuck distance was two times greater than the initial distance (in other words, 20 mm).

A dumbbell-shaped sample was punched out from the polypropylene molded article (sample after the heat stretching step) thus manufactured and a stress-strain curve was measured with a tension testing machine. As a result, it was found that the sample had high strength, namely, a rupture stress (in other words, rupture strength) of 361 MPa and a tensile elastic modulus of 6.1 GPa.

Figure 1:
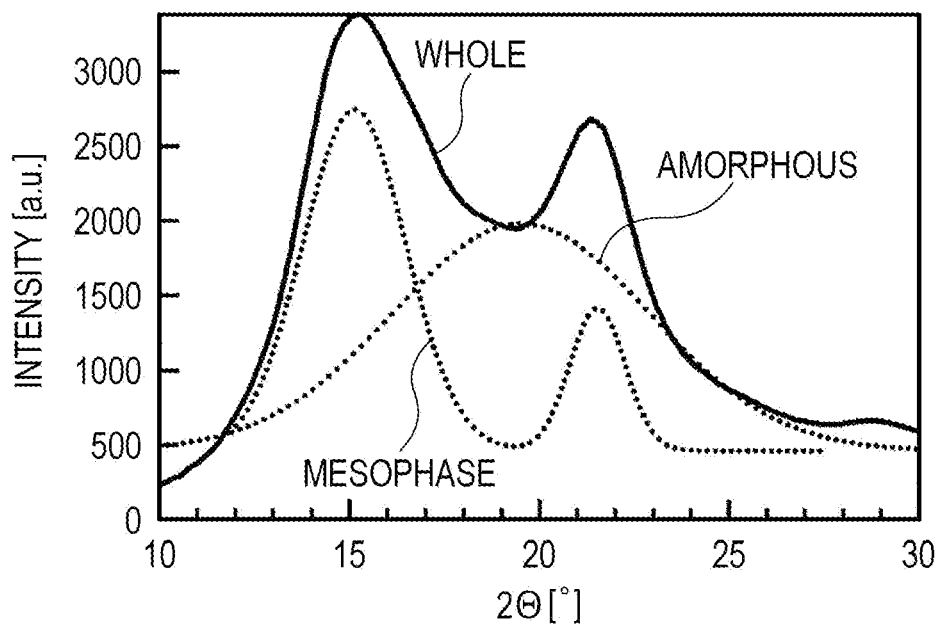
FIG. 1 is a graph indicating the results of wide-angle X-ray diffraction measurement on a sample after a cooling step in Example 1, in which a crystalline ($\alpha$ crystals) phase, an amorphous phase, and a mesophase are separated.
Figure 2:
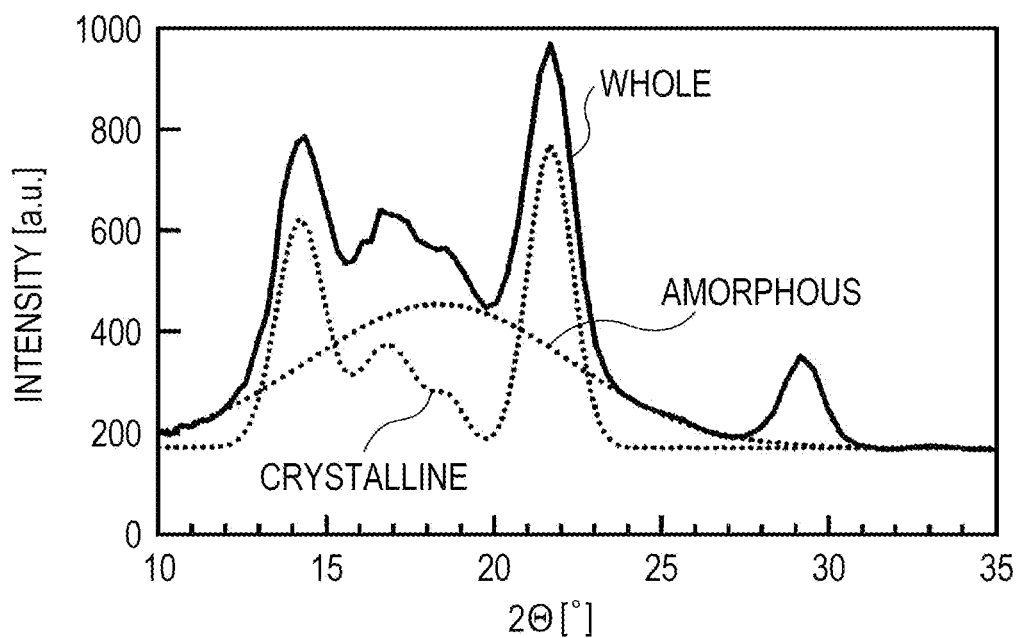
FIG. 2 is a graph indicating the results of wide-angle X-ray diffraction measurement on a sample after a heat stretching step in Example 1, in which a crystalline ($\alpha$ crystals) phase, an amorphous phase, and a mesophase are separated.

FIGS. 1 and 2 respectively show the results of wide-angle X-ray diffraction measurement on a sample after the cooling step and a sample after the heat stretching step, in which a crystalline (α crystals) phase, an amorphous phase, and an intermediate phase, i.e., a mesophase, are separated. FIG. 1 indicates that the sample after the cooling step was constituted by 0% crystalline phase (α crystals), 58% amorphous phase, and 42% mesophase. FIG. 2 indicates that the sample after the heat stretching step was constituted by 48% crystalline phase (α crystals), 52% amorphous phase, and 0% mesophase.

Figure 3:
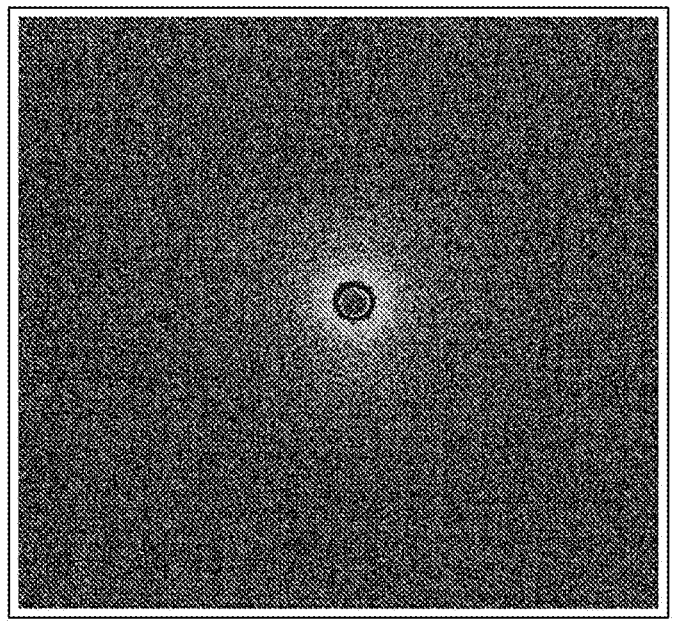
FIG. 3 is an image showing the results of SAXS measurement on a sample after the heat stretching step in Example 1.
Figure 4:
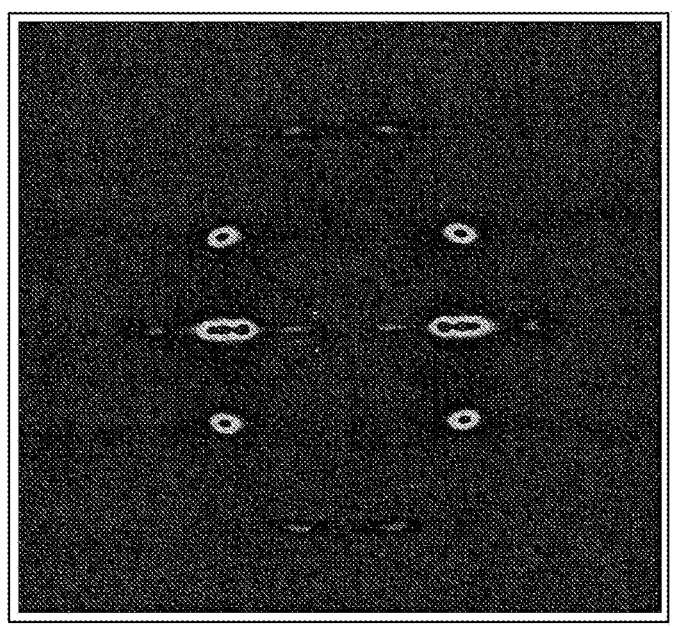
FIG. 4 is an image showing the results of wide-angle X-ray diffraction measurement on a sample after the heat stretching step in Example 1.

FIGS. 3 and 4 respectively show the results of SAXS measurement and wide-angle X-ray diffraction measurement on a sample after the heat stretching step. The SAXS image in FIG. 3 indicates that the long period is as small as 12.46 nm and that the refinement of crystals occurred in the sample. The azimuth angular distribution was calculated from the wide-angle X-ray diffraction image in FIG. 4. It was found that the half width of the orientation peak was as small as 3.56° and that the sample was highly oriented.

Example 2

This example differs from Example 1 in that a polypropylene sheet having a thickness of 900 μm was used in the heating step.

A dumbbell-shaped sample was punched out from the sample after the heat stretching step and a stress-strain curve was measured with a tension testing machine. As a result, it was found that the sample had high strength, namely, a rupture stress of 309 MPa.

Figure 5:
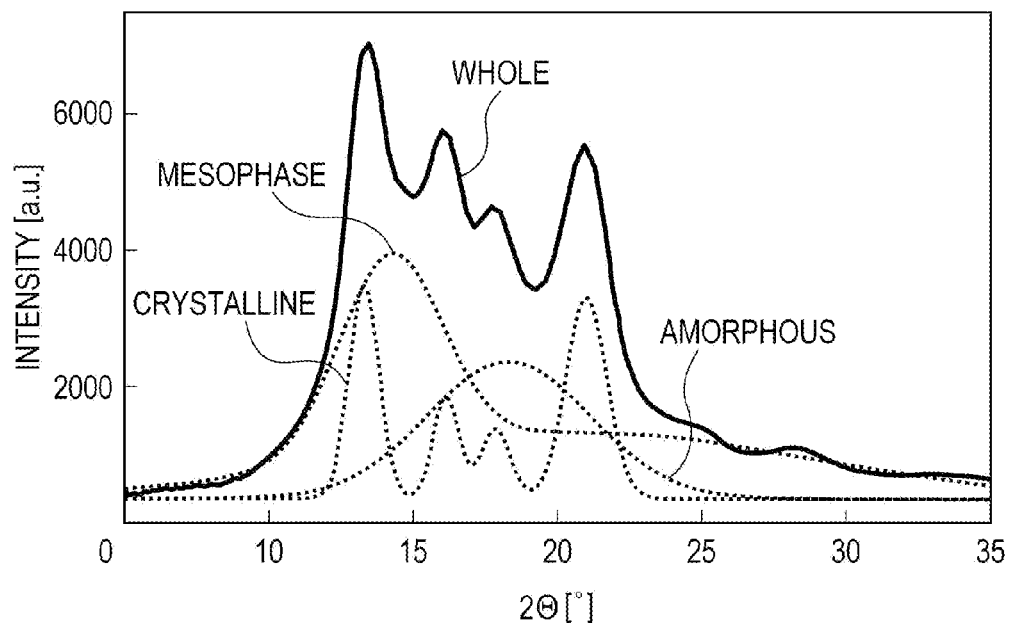
FIG. 5 is a graph indicating the results of wide-angle X-ray diffraction measurement on a sample after a cooling step in Example 2, in which a crystalline ($\alpha$ crystals) phase, an amorphous phase, and a mesophase are separated.

FIG. 5 indicates the results of wide-angle X-ray diffraction measurement on a sample after the cooling step, in which a crystalline phase (α crystals), an amorphous phase, and a mesophase are separated. FIG. 5 indicates that the sample after the cooling step was constituted by 25% crystalline phase (α crystals), 19% amorphous phase, and 56% mesophase.

It should be noted here that, generally, crystallization into α crystals proceeds by increasing the temperature and extending the time for which the high temperature is retained. The crystallinity degree of the sample after the cooling step is 25% and is higher than in Example 1. Thus, the crystallinity degree obtained by the wide-angle X-ray diffraction measurement on the sample after the heat stretching is presumed to be also higher than 48% observed in Example 1.

Example 3

This example differs from Example 2 in that the melt of the polypropylene was immersed in water at a temperature of 25° C. in the cooling step.

A dumbbell-shaped sample was punched out from the sample after the heat stretching step and a stress-strain curve was measured with a tension testing machine. As a result, it was found that the sample had high strength, namely, a rupture stress of 333 MPa.

Figure 6:
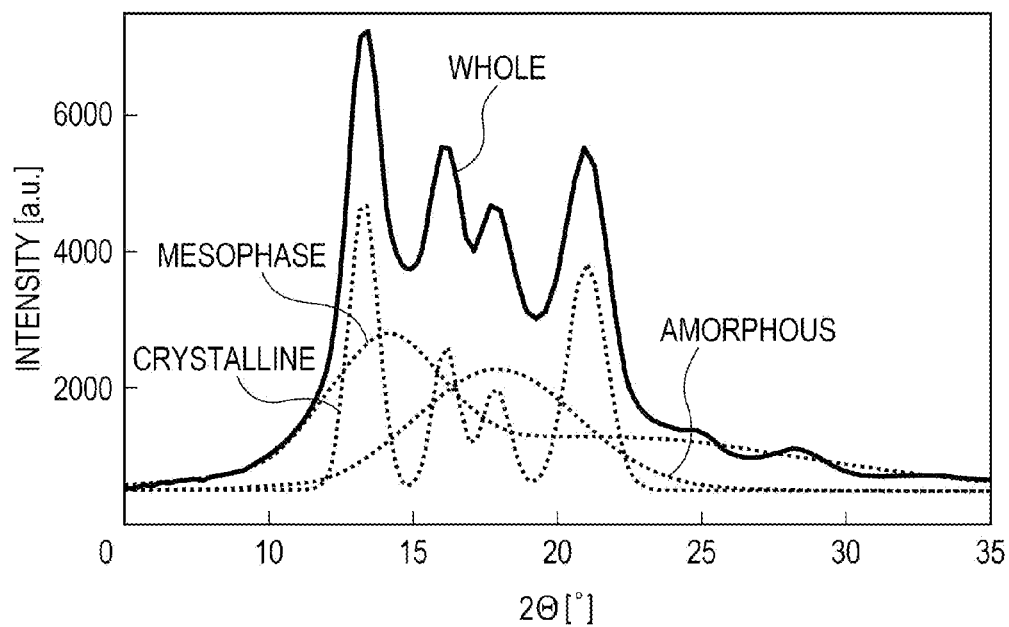
FIG. 6 is a graph indicating the results of wide-angle X-ray diffraction measurement on a sample after a cooling step in Example 3, in which a crystalline ($\alpha$ crystals) phase, an amorphous phase, and a mesophase are separated.

FIG. 6 indicates the results of wide-angle X-ray diffraction measurement, in which a crystalline (α crystals) phase, an amorphous phase, and a mesophase are separated. FIG. 6 indicates that the sample after the cooling step is constituted by 30 crystalline phase (α crystals), 24% amorphous phase, and 46% mesophase.

Since the crystallinity degree of the sample after the cooling step is 30% and is higher than that in Example 1, the crystallinity degree obtained by the wide-angle X-ray diffraction measurement on a sample after the heat stretching is presumed to be also higher than 48% observed in Example 1.

Example 4

This example differs from Example 1 in that, in the room-temperature stretching step, room-temperature stretching was conducted until the chuck-to-chuck distance was two times greater than the initial distance (in other words, 20 mm).

A dumbbell-shaped sample was punched out from the sample after the heat stretching step and a stress-strain curve was measured with a tension testing machine. As a result, it was found that the sample had high strength, namely, a rupture stress of 363 MPa and a tensile elastic modulus of 6.1 GPa.

Figure 7:
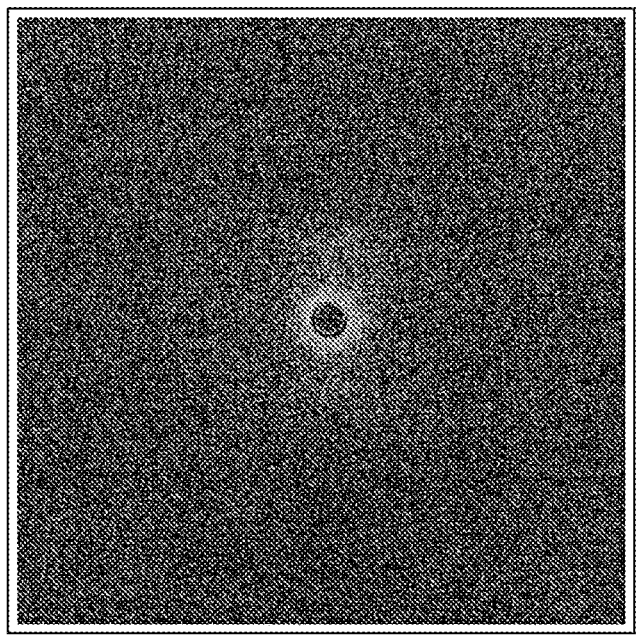
FIG. 7 is an image showing the results of SAXS measurement on a sample after a heat stretching step in Example 4.
Figure 8:
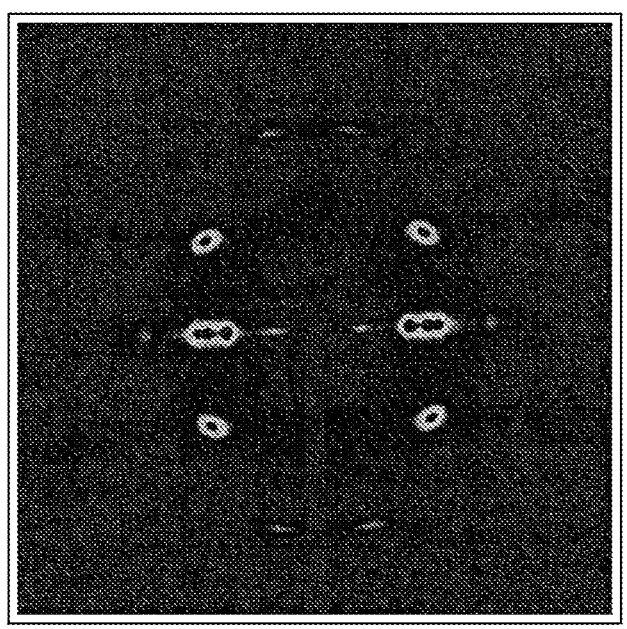
FIG. 8 is an image showing the results of wide-angle X-ray diffraction measurement on a sample after the heat stretching step in Example 4.

FIGS. 7 and 8 respectively show the results of SAXS measurement and wide-angle X-ray diffraction measurement on a sample after the heat stretching step. The SAXS image in FIG. 7 indicates that the long period is as small as 15.95 nm and that the refinement of crystals occurred in the sample. The azimuth angular distribution was calculated from the wide-angle X-ray diffraction image in FIG. 8. It was found that the half width of the orientation peak was as small as 4.93° and that the sample was highly oriented.

The process for the heat stretching was the same as in Example 1. Thus, the crystallinity degree obtained by the wide-angle X-ray diffraction measurement on a sample after the heat stretching is presumed to be similar to that in Example 1.

Figure 9:
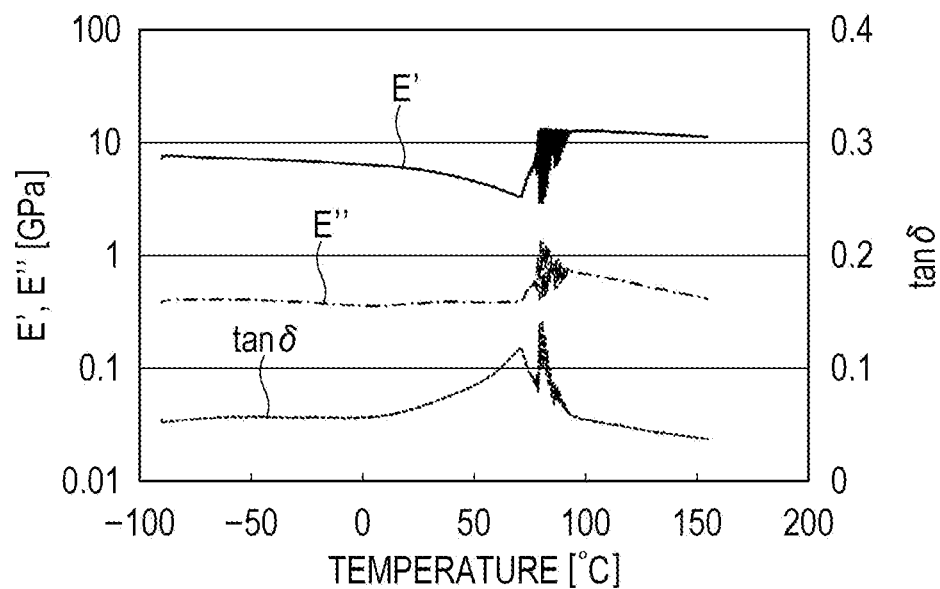
FIG. 9 is a graph indicating the results of dynamic viscoelasticity analysis at a frequency of 10 Hz and a heatup rate of 2° C./min on a sample after a heat stretching step in Example 4.

FIG. 9 indicates the results of dynamic viscoelasticity analysis at a frequency of 10 Hz and a heatup rate of 2° C./min on a sample after the heat stretching step. As indicated in FIG. 9, the storage elastic modulus E' is larger at 120° C. than at 50° C. The loss modulus E" monotonically increases with the increase in temperature in the range of 0° C. to 50° C. The tan δ indicated in FIG. 9 is the ratio of the loss modulus E" to the storage elastic modulus E'(E"/E') and is referred to as a loss tangent.

The dynamic viscoelasticity analysis was conducted in accordance with JIS K 7244-4 with Dynamic Mechanical Spectrometer DMS6100 produced by SII Nano Technology Inc.

Example 5

This example differs from Example 1 in that, in the room-temperature stretching step, room-temperature stretching was conducted until the chuck-to-chuck distance was five times greater than the original distance (in other words, 50 mm).

A dumbbell-shaped sample was punched out from the sample after the heat stretching step and a stress-strain curve was measured with a tension testing machine. As a result, it was found that the sample had high strength, namely, a rupture stress of 381 MPa and a tensile elastic modulus of 4.4 GPa.

Figure 10:
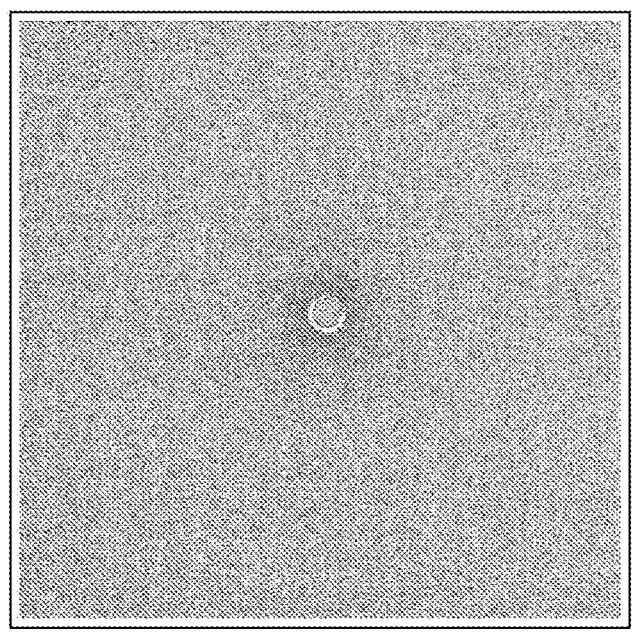
FIG. 10 is an image showing the results of SAXS measurement on a sample after a heat stretching step in Example 5.
Figure 11:
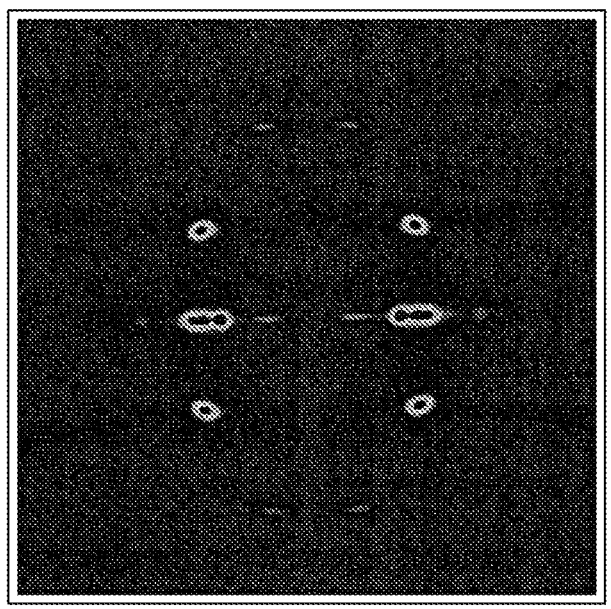
FIG. 11 is an image showing the results of wide-angle X-ray diffraction measurement on a sample after the heat stretching step in Example 5.

FIGS. 10 and 11 respectively show the results of SAXS measurement and wide-angle X-ray diffraction measurement on a sample after the heat stretching step. The SAXS image in FIG. 10 indicates that the long period is as small as 13.01 nm and that the refinement of crystals occurred in the sample. The azimuth angular distribution was calculated from the wide-angle X-ray diffraction image in FIG. 11. It was found that the half width of the orientation peak was as small as 3.96° and that the sample was highly oriented.

The process for the heat stretching was the same as in Example 1. Thus, the crystallinity degree obtained by the wide-angle X-ray diffraction measurement on a sample after the heat stretching is presumed to be similar to that in Example 1.

Example 6

This example differs from Example 1 in that, in the heat stretching step, heat stretching was conducted by increasing the temperature inside the stretching machine to 120° C.

A dumbbell-shaped sample was punched out from the sample after the heat stretching step and a stress-strain curve was measured with a tension testing machine. As a result, it was found that the sample had high strength, namely, a rupture stress of 368 MPa and a tensile elastic modulus of 5.0 GPa.

The heating temperature during the heat stretching was higher than in Example 1. Thus, the crystallinity degree obtained by the wide-angle X-ray diffraction measurement on the sample after the heat stretching is presumed to be higher than in Example 1.

Example 7

This example differs from Example 1 in that, in the heat stretching step, the temperature inside the stretching machine was increased to 140° C.

A dumbbell-shaped sample was punched out from the sample after the heat stretching step and a stress-strain curve was measured with a tension testing machine. As a result, it was found that the sample had high strength, namely, a rupture stress of 370 MPa and a tensile elastic modulus of 4.8 GPa.

The heating temperature during the heat stretching was higher than in Example 1. Thus, the crystallinity degree obtained by the wide-angle X-ray diffraction measurement on the sample after the heat stretching is presumed to be higher than in Example 1.

Example 8

This example differs from Example 1 in that, in the heat stretching step, heat stretching was conducted until the chuck-to-chuck distance was four times greater than the original distance (in other words, 40 mm).

A dumbbell-shaped sample was punched out from the sample after the heat stretching step and a stress-strain curve was measured with a tension testing machine. As a result, it was found that the sample had high strength, namely, a rupture stress of 305 MPa and a tensile elastic modulus of 6.1 GPa.

Figure 12:
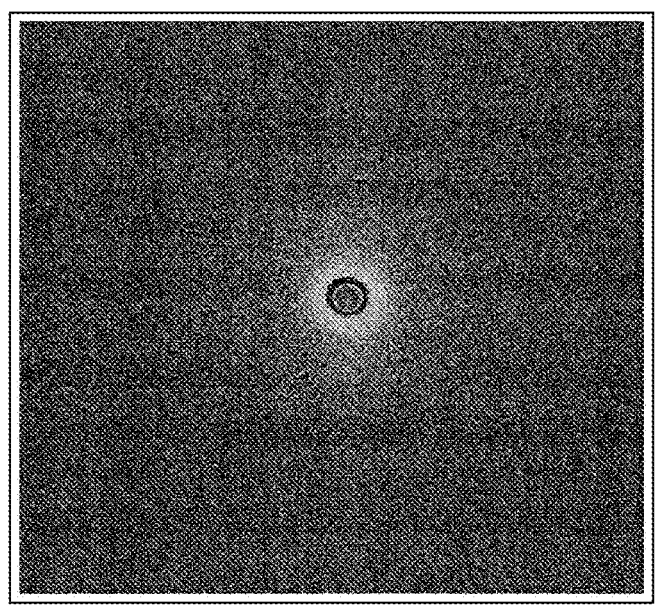
FIG. 12 is an image showing the results of SAXS measurement on a sample after a heat stretching step in Example 8.
Figure 13:
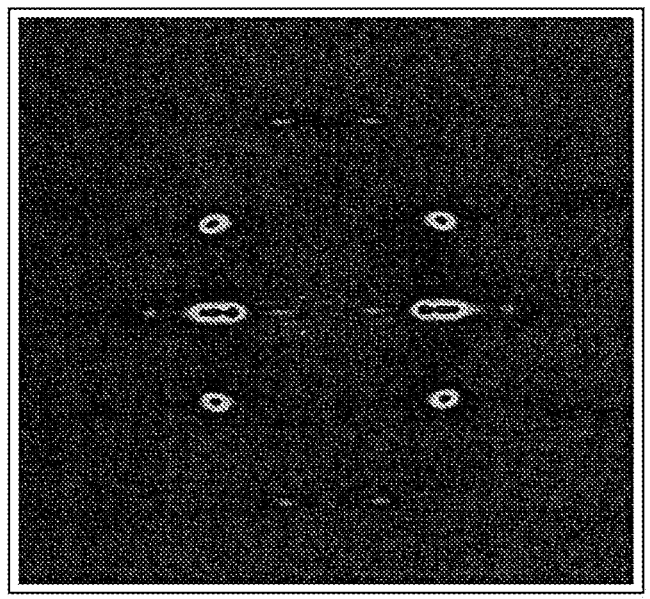
FIG. 13 is an image showing the results of wide-angle X-ray diffraction measurement on a sample after the heat stretching step in Example 8.

FIGS. 12 and 13 respectively show the results of SAXS measurement and wide-angle X-ray diffraction measurement on a sample after the heat stretching step. The SAXS image in FIG. 12 indicates that the long period is small and that the refinement of crystals occurred in the sample. The azimuth angular distribution was calculated from the wide-angle X-ray diffraction image in FIG. 13. It was found that the half width of the orientation peak was small and that the sample was highly oriented.

The stretching ratio during the heat stretching was higher than that in Example 1 and thus the retention time for heat stretching was long. Thus, the crystallinity degree obtained by the wide-angle X-ray diffraction measurement on the sample after the heat stretching is presumed to be higher than that in Example 1.

Example 9

This example differs from Example 1 in that, in the heat stretching step, heat stretching was conducted until the chuck-to-chuck distance was five times greater than the original distance (in other words, 50 mm).

A dumbbell-shaped sample was punched out from the sample after the heat stretching step and a stress-strain curve was measured with a tension testing machine. As a result, it was found that the sample had high strength, namely, a rupture stress of 380 MPa and a tensile elastic modulus of 4.4 GPa.

Figure 14:
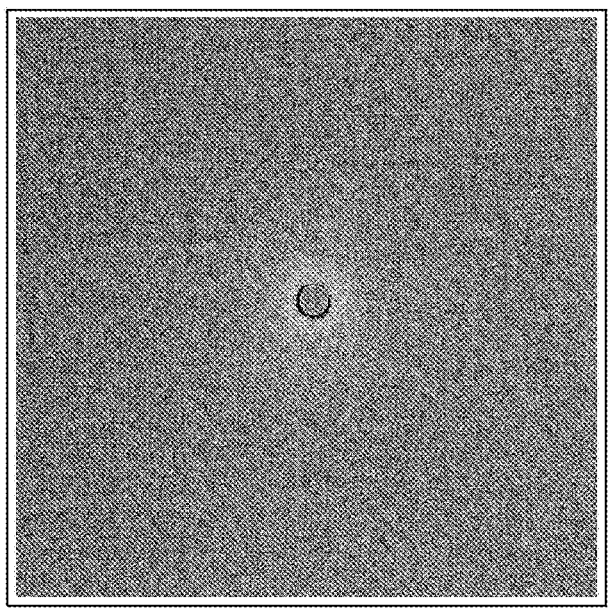
FIG. 14 is an image showing the results of SAXS measurement on a sample after a heat stretching step in Example 9.
Figure 15:
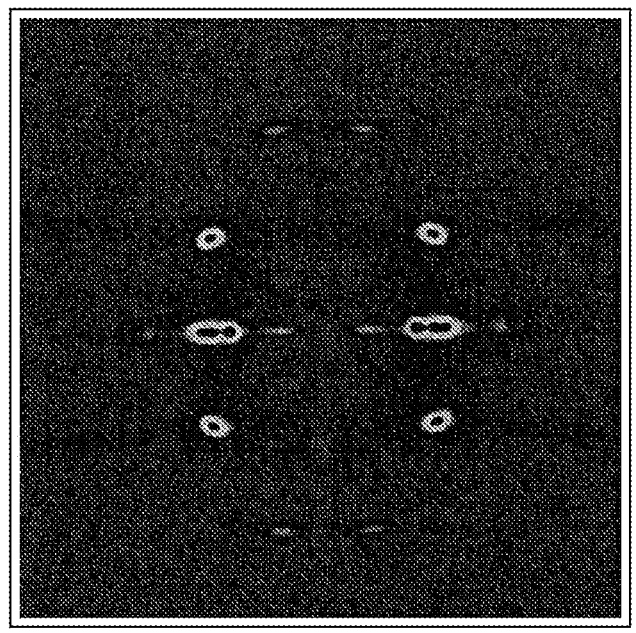
FIG. 15 is an image showing the results of wide-angle X-ray diffraction measurement on a sample after the heat stretching step in Example 9.

FIGS. 14 and 15 respectively show the results of SAXS measurement and wide-angle X-ray diffraction measurement on a sample after the heat stretching step. The SAXS image in FIG. 14 indicates that the long period is small and that the refinement of crystals occurred in the sample. The azimuth angular distribution was calculated from the wide-angle X-ray diffraction image in FIG. 15. It was found that the half width of the orientation peak was small and that the sample was highly oriented.

The stretching ratio during the heat stretching was higher than that in Example 1 and thus the retention time for heat stretching was long. Thus, the crystallinity degree obtained by the wide-angle X-ray diffraction measurement on a sample after the heat stretching is presumed to be higher than that in Example 1.

Example 10

Figure 43:
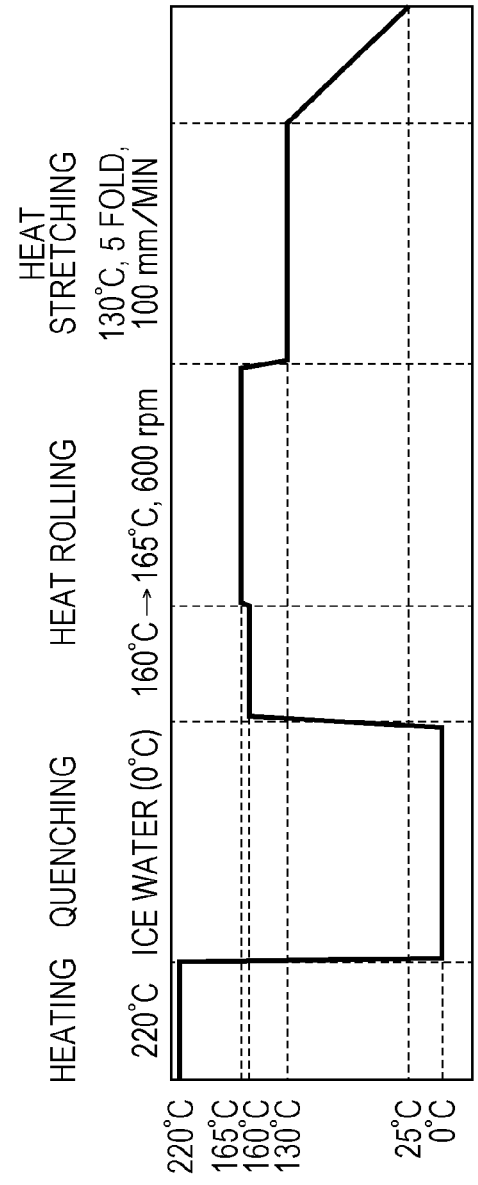
FIG. 43 is a diagram showing a flow (relationship between time and temperature) of a manufacturing process of Example 10.

A polypropylene molded article was manufactured by a manufacturing method that included the following steps. The flow of the manufacturing of this example (the relationship between time and temperature) was as illustrated in FIG. 43.

Heating Step:

A sheet having a thickness of 300 μm formed of isotactic polypropylene beads (trade name: H-700) produced by Prime Polymer Co., Ltd., was interposed between two cover glasses and placed on a 220° C. hot plate to be heated and melted (preparation of a melt).

Cooling Step:

The melt of the polypropylene (polypropylene melt) as interposed between the cover glasses was immersed in ice water at 0° C. to conduct quenching.

Heat Rolling Step:

A sample solidified by quenching was interposed between two polyimide films and heated on a 160° C. hot plate. Then the sample as interposed between the polyimide films was inserted between rollers at a temperature of 165° C. in a rolling machine. The rollers were rotated in directions opposite to each other at a rotation rate of 600 rpm to conduct heat rolling. The material (polypropylene) used in this example had an endothermic peak at 160° C. as obtained by DSC analysis.

Heat Stretching Step:

A strip of sheet was cut from the sample after the heat rolling step and this sheet was retained in a stretching machine at a chuck-to-chuck distance of 10 mm. The temperature inside the stretching machine was increased to 130° C. and heat stretching was conducted at a stretching rate of 100 mm/min until the chuck-to-chuck distance was five times greater than the initial distance (in other words, 50 mm).

A dumbbell-shaped sample was punched out from the polypropylene molded article (sample after the heat stretching step) thus manufactured and a stress-strain curve was measured with a tension testing machine. As a result, it was found that the sample had high strength, namely, a rupture stress (in other words, rupture strength) of 361 MPa and a tensile elastic modulus of 7.2 GPa.

Figure 16:
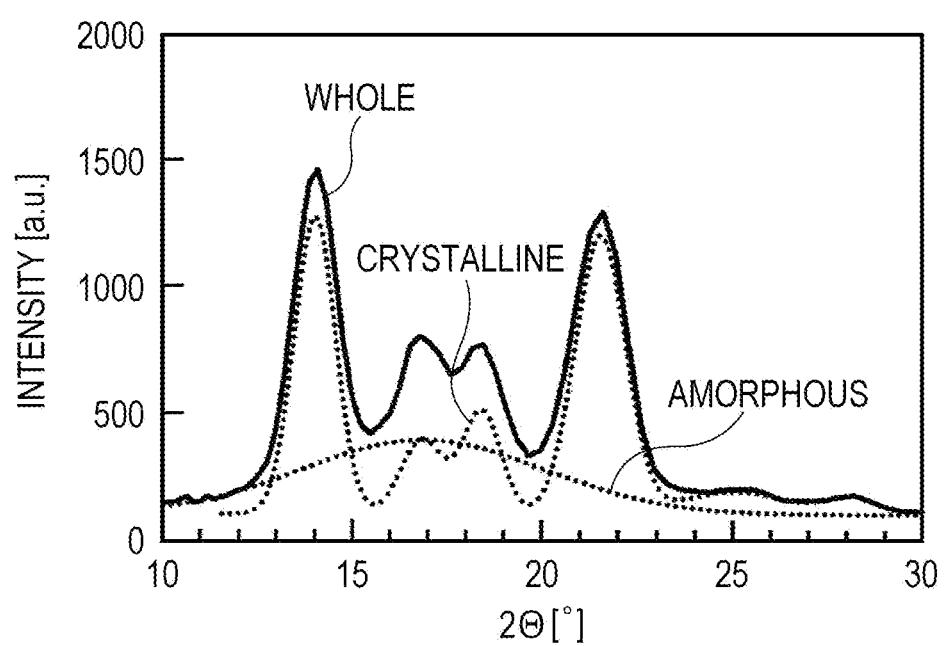
FIG. 16 is a graph indicating the results of wide-angle X-ray diffraction measurement on a sample after a heat stretching step in Example 10, in which a crystalline (α crystals) phase, an amorphous phase, and a mesophase are separated.

FIG. 16 indicates the results of wide-angle X-ray diffraction measurement on a sample after the heat stretching step, in which a crystalline (α crystals) phase, an amorphous phase, and a mesophase are separated. FIG. 16 indicates that the sample after the heat stretching step was constituted by 68% crystalline phase (α crystals), 32% amorphous phase, and 0% mesophase.

Figure 17:
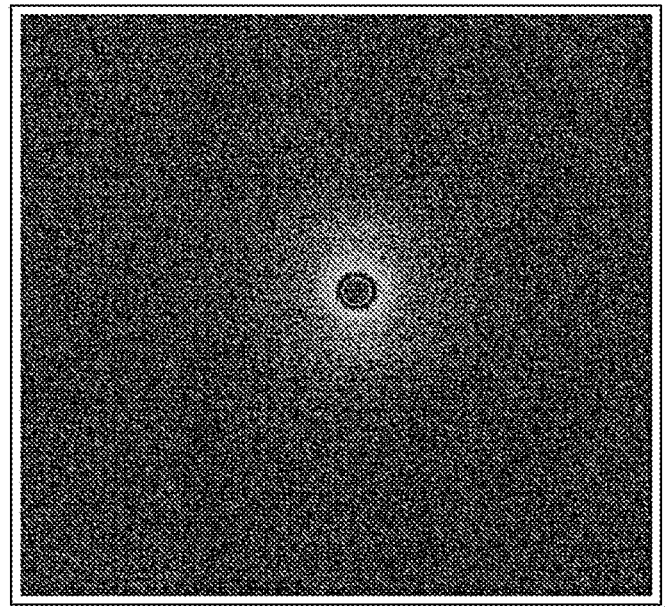
FIG. 17 is an image showing the results of SAXS measurement on a sample after the heat stretching step in Example 10.
Figure 18:
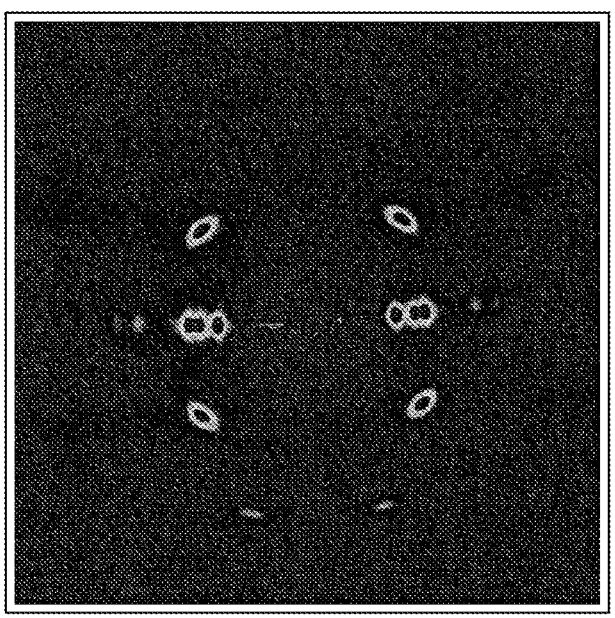
FIG. 18 is an image showing the results of wide-angle X-ray diffraction measurement on a sample after the heat stretching step in Example 10.

FIGS. 17 and 18 respectively show the results of SAXS measurement and wide-angle X-ray diffraction measurement on a sample after the heat stretching step. The SAXS image in FIG. 17 indicates that the long period is as small as 15.93 nm and that the refinement of crystals occurred in the sample. The azimuth angular distribution was calculated from the wide-angle X-ray diffraction image in FIG. 18. It was found that the half width of the orientation peak was as small as 4.88° and that the sample was highly oriented.

Example 11

This example differs from Example 10 in that, in the heat stretching step, the temperature inside the stretching machine was increased to 120° C. to conduct heat stretching.

A dumbbell-shaped sample was punched out from the sample after the heat stretching step and a stress-strain curve was measured with a tension testing machine. As a result, it was found that the sample had high strength, namely, a rupture stress of 345 MPa.

The crystallinity degree obtained by wide-angle X-ray diffraction measurement on a sample after the heat stretching in this example is presumed to be higher than that in Example 1 since the method included the heat rolling step not included in Example 1.

Example 12

This example differs from Example 10 in that, in the heat stretching step, the temperature inside the stretching machine was increased to 140° C. to conduct heat stretching.

A dumbbell-shaped sample was punched out from the sample after the heat stretching step and a stress-strain curve was measured with a tension testing machine. As a result, it was found that the sample had high strength, namely, a rupture stress of 380 MPa.

The crystallinity degree obtained by wide-angle X-ray diffraction measurement on a sample after the heat stretching in this example is presumed to be higher than that in Example 1 since the method included the heat rolling step not included in Example 1.

Example 13

This example differs from Example 10 in that, in the heat stretching step, heat stretching was conducted until the chuck-to-chuck distance was four times greater than original distance (in other words, 40 mm).

A dumbbell-shaped sample was punched out from the sample after the heat stretching step and a stress-strain curve was measured with a tension testing machine. As a result, it was found that the sample had high strength, namely, a rupture stress of 383 MPa and a tensile elastic modulus of 6.3 GPa.

Figure 19:
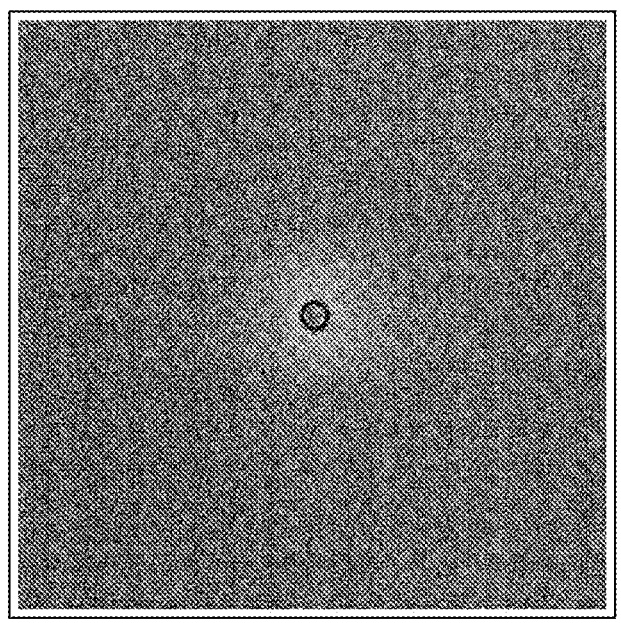
FIG. 19 is an image showing the results of SAXS measurement on a sample after a heat stretching step in Example 13.
Figure 20:
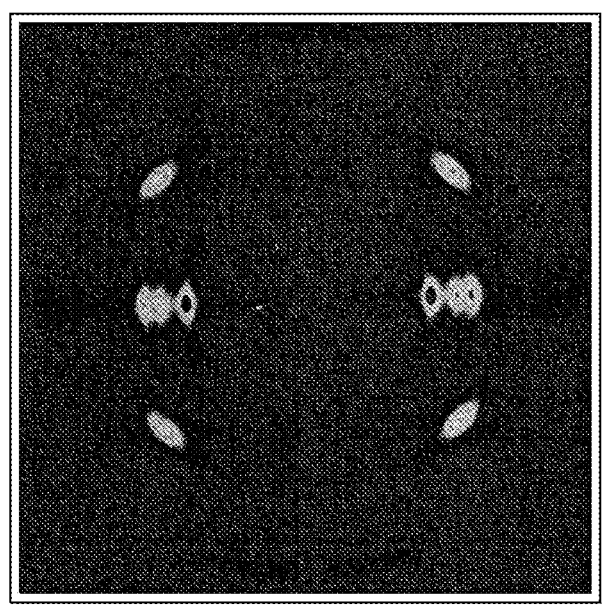
FIG. 20 is an image showing the results of wide-angle X-ray diffraction measurement on a sample after the heat stretching step in Example 13.

FIGS. 19 and 20 respectively show the results of SAXS measurement and wide-angle X-ray diffraction measurement on a sample after the heat stretching step. The SAXS image in FIG. 19 indicates that the long period is as small as 15.5 nm and that the refinement of crystals occurred in the sample. The azimuth angular distribution was calculated from the wide-angle X-ray diffraction image in FIG. 20. It was found that the half width of the orientation peak was as small as 5.41° and that the sample was highly oriented.

Since this example includes the heat rolling step not included in Example 1, the crystallinity degree obtained by wide-angle X-ray diffraction measurement on a sample after heat stretching is presumed to be higher than that in Example 1.

Example 14

This example differs from Example 10 in that, in the heat stretching step, heat stretching was conducted until the chuck-to-chuck distance was six times greater than the initial distance (60 mm).

A dumbbell-shaped sample was punched out from the sample after the heat stretching step and a stress-strain curve was measured with a tension testing machine. As a result, it was found that the sample had high strength, namely, a rupture stress of 476 MPa and a tensile elastic modulus of 8.2 GPa. The rupture stress of the polypropylene molded article of this example is higher than the rupture strength (451 MPa) of a type of stainless steel, SUS405 (Japanese Industrial Standard) and the polypropylene molded article can be used as an alternative for this stainless steel.

Figure 21:
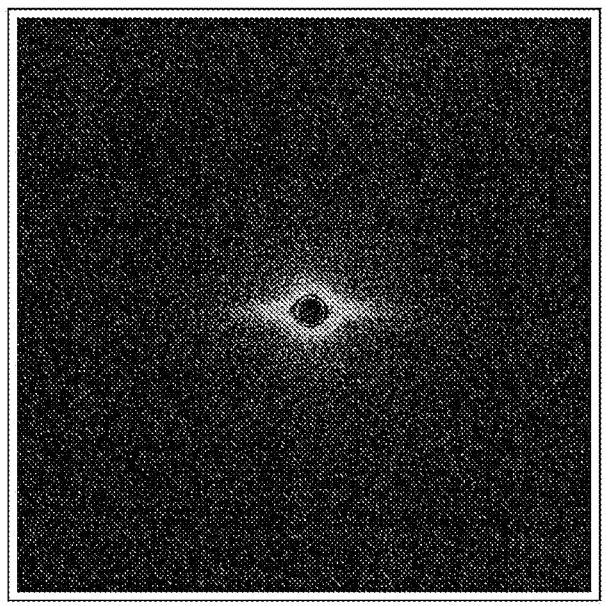
FIG. 21 is an image showing the results of SAXS measurement on a sample after a heat stretching step in Example 14.
Figure 22:
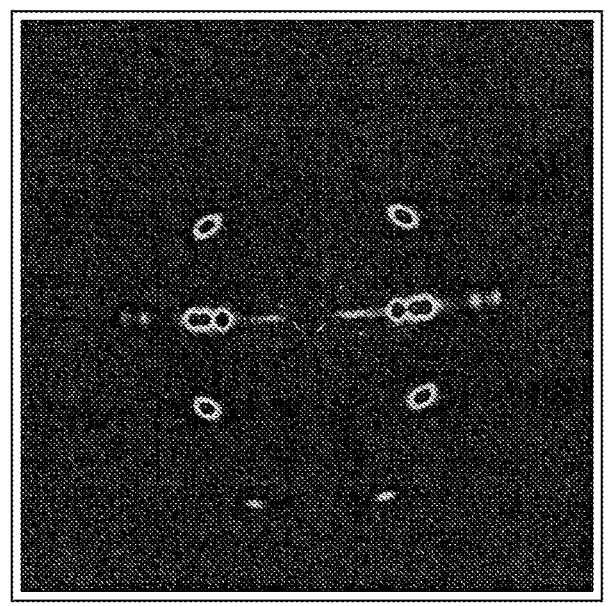
FIG. 22 is an image showing the results of wide-angle X-ray diffraction measurement on a sample after the heat stretching step in Example 14.

FIGS. 21 and 22 respectively show the results of SAXS measurement and wide-angle X-ray diffraction measurement on a sample after the heat stretching step. The SAXS image in FIG. 21 indicates that the long period is small and that the refinement of crystals occurred in the sample. The azimuth angular distribution was calculated from the wide-angle X-ray diffraction image in FIG. 22. It was found that the half width of the orientation peak was as small as 4.08° and that the sample was highly oriented.

Since this example includes the heat rolling step not included in Example 1, the crystallinity degree obtained by wide-angle X-ray diffraction measurement on a sample after heat stretching is presumed to be higher than that in Example 1.

Example 15

This example differs from Example 10 in that, in the heat stretching step, heat stretching was conducted at a stretching rate of 50 mm/min.

A dumbbell-shaped sample was punched out from the sample after the heat stretching step and a stress-strain curve was measured with a tension testing machine. As a result, it was found that the sample had high strength, namely, a rupture stress of 375 MPa.

Since this example includes the heat rolling step not included in Example 1, the crystallinity degree obtained by wide-angle X-ray diffraction measurement on a sample after heat stretching is presumed to be higher than that in Example 1.

Example 16

This example differs from Example 10 in that, in the heat stretching step, heat stretching was conducted at a stretching rate of 200 mm/min.

A dumbbell-shaped sample was punched out from the sample after the heat stretching step and a stress-strain curve was measured with a tension testing machine. As a result, it was found that the sample had high strength, namely, a rupture stress of 407 MPa.

Since this example includes the heat rolling step not included in Example 1, the crystallinity degree obtained by wide-angle X-ray diffraction measurement on a sample after heat stretching is presumed to be higher than that in Example 1.

The size of the α crystals is determined based on the growth induced by a heat treatment and refinement by stretching. Accordingly, since the product of the stretching ratio in the room-temperature stretching step and the stretching ratio in the heat stretching step is the smallest in Example 4 among Examples 0.1 to 9, the size of the α crystals in Examples 1 to 3, 5, 8, and 9 is presumed to be smaller than that in Example 4. Here, Examples 6 and 7 are excluded since the heating temperature in the heat stretching step is different. In Examples 6 and 7, the heating temperature in the heat stretching step is less than the heating temperature in the heat rolling step in Example 10. Accordingly, the increase in crystal size rarely occurs in Examples 6 and 7 compared to Example 10. Regarding the product of the stretching ratio in the room-temperature stretching step and the stretching ratio in the heat stretching step, the stretching ratios in Examples 6 and 7 are larger than that in Example 10 and thus reduction of crystal size easily occurs in Examples 6 and 7 compared to Example 10. Thus, the crystal size in Examples 6 and 7 is presumed to be smaller than in Example 10.

In Examples 10 to 16, the heat rolling step that involves a high heat treatment temperature is presumed to be dominant regarding the influence on the crystal size. Accordingly, the size of α crystals in Examples 11, 12, and 14 to 16 that included a heat rolling step similar to that in Example 10 is presumed to be similar to that in Example 10.

The degree of orientation of a polypropylene molded article depends on the stretching ratio in the stretching step. The higher the stretching ratio, the higher the degree of orientation. Accordingly, in Examples 1 to 9, the degree of orientation of the polypropylene molded article depends on the product of the stretching ratio in the room-temperature stretching step and the stretching ratio in the heat stretching step. Thus, the half width obtained in the wide-angle X-ray diffraction measurement on a polypropylene molded article is presumed to be the largest in Example 4 among Examples 1 to 9 and smaller in Examples 2, 3, and 6 to 9 than in Example 4.

The degree of orientation of a polypropylene molded article depends on the product of the stretching ratio in the heat rolling step and the stretching ratio in the heat stretching step in Examples 10 to 16. Thus, the half width obtained by the wide-angle X-ray diffraction measurement on a polypropylene molded article is presumed to be the largest in Example 13 among Examples 10 to 16 and smaller in Examples 11, 12, and 14 to 16 than in Example 13.

Comparative Example 1

A polypropylene molded article was manufactured by a manufacturing method that included the following steps.
Heating Step:
A sheet having a thickness of 300 μm formed of isotactic polypropylene beads (trade name: H-700) produced by Prime Polymer Co., Ltd., was interposed between two cover glasses and placed on a 220° C. hot plate to be heated and melted (preparation of a melt).
Cooling Step:
The melt of the polypropylene (polypropylene melt) as interposed between the cover glasses was left in a room temperature environment (temperature: 25° C.) to cool.
A dumbbell-shaped sample was punched out from the polypropylene molded article (sample after the cooling step) thus manufactured and a stress-strain curve was measured with a tension testing machine. As a result, it was found that the sample had low strength, namely, a rupture stress (in other words, rupture strength) of 35 MPa and a tensile elastic modulus of 1.6 GPa.

Figure 23:
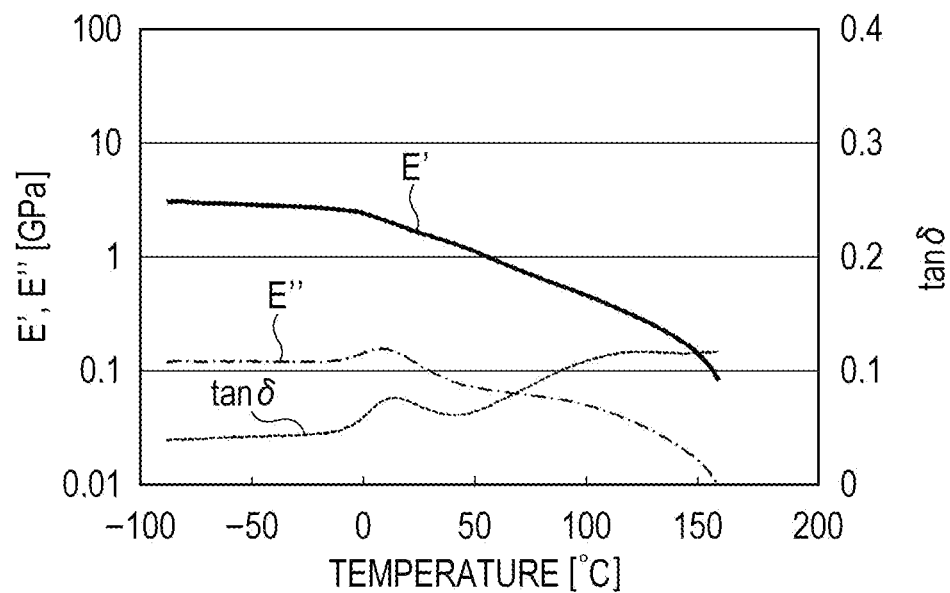
FIG. 23 is a graph indicating the results of dynamic viscoelasticity analysis at a frequency of 10 Hz and a heatup rate of 2° C./min on a sample after a cooling step in Comparative Example 1.

FIG. 23 indicates the results of dynamic viscoelasticity analysis at a frequency of 10 Hz and a heatup rate of 2° C./min on a sample after the cooling step. As indicated in FIG. 23, both the storage elastic modulus E' and the loss modulus E" monotonically decreased with the increase in temperature from 0° C.

Comparative Example 2

A polypropylene molded article was manufactured by a manufacturing method that included the following steps.
Heating Step:
A sheet having a thickness of 300 μm formed of isotactic polypropylene beads (trade name: H-700) produced by Prime Polymer Co., Ltd., was interposed between two cover glasses and placed on a 220° C. hot plate to be heated and melted (preparation of a melt).
Cooling Step:
The melt of the polypropylene (polypropylene melt) as interposed between the cover glasses was immersed in ice water at 0° C. to conduct quenching.
A dumbbell-shaped sample was punched out from the polypropylene molded article (sample after the cooling step) thus manufactured and a stress-strain curve was measured with a tension testing machine. As a result, it was found that the sample had low strength, namely, a rupture stress of 28 MPa.

Figure 24:
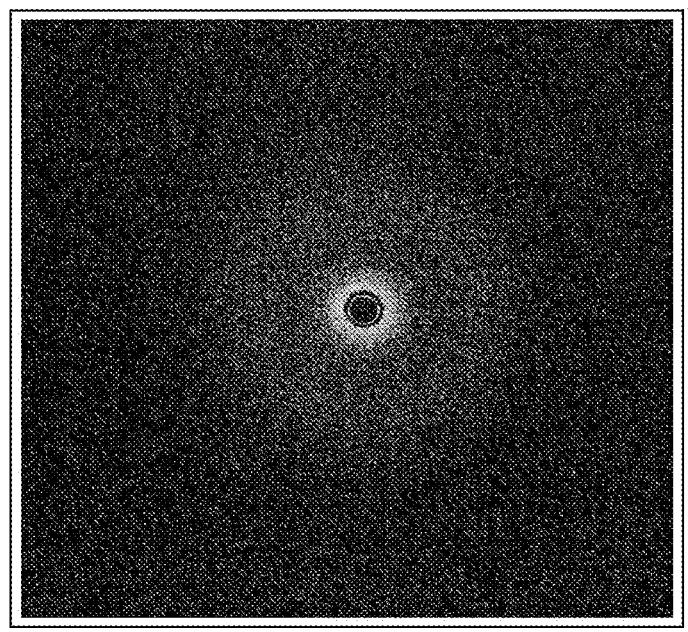
FIG. 24 is an image showing the results of SAXS measurement on a sample after a cooling step in Comparative Example 2.
Figure 25:
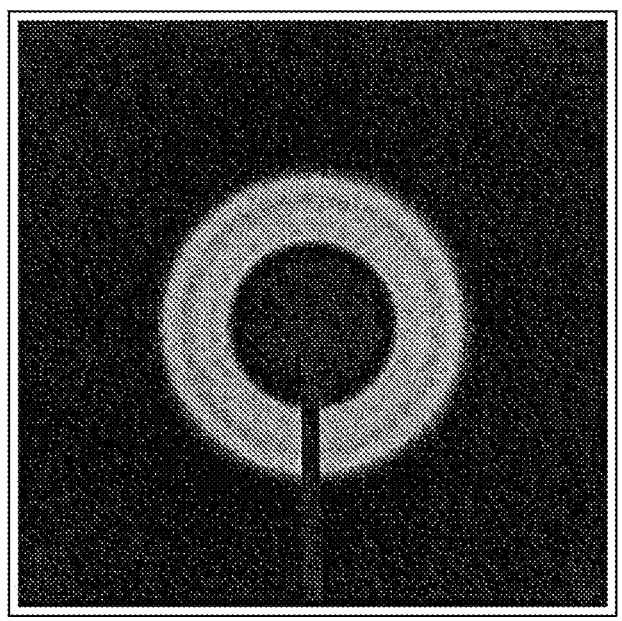
FIG. 25 is an image showing the results of wide-angle X-ray diffraction measurement on a sample after the cooling step in Comparative Example 2.

FIGS. 24 and 25 respectively show the results of SAXS measurement and wide-angle X-ray diffraction measurement on a sample after the cooling step. The SAXS image in FIG. 24 indicates that the long period is as small as 8.88 nm and that the refinement of crystals occurred in the sample. However, the wide-angle X-ray diffraction image in FIG. 25 found that the sample had no orientation.

Comparative Example 3

This comparative example differs from Comparative Example 2 in that the following room-temperature stretching step was conducted after the cooling step.
Room-Temperature Stretching Step:
A strip of sheet was cut from the sample after the cooling step and the sheet was retained in a stretching machine at a chuck-to-chuck distance of 10 mm. While retaining the temperature inside the stretching machine at 25° C., room-temperature stretching was conducted at a stretching rate of 100 mm/min until the chuck-to-chuck distance was four times greater than the initial distance (in other words, 40 mm).
A dumbbell-shaped sample was punched out from the sample after the room-temperature stretching step and a stress-strain curve was measured with a tension testing machine. As a result, the sample was found to have low strength, namely, a rupture stress of 105 MPa and a tensile elastic modulus of 1.8 GPa.

Figure 26:
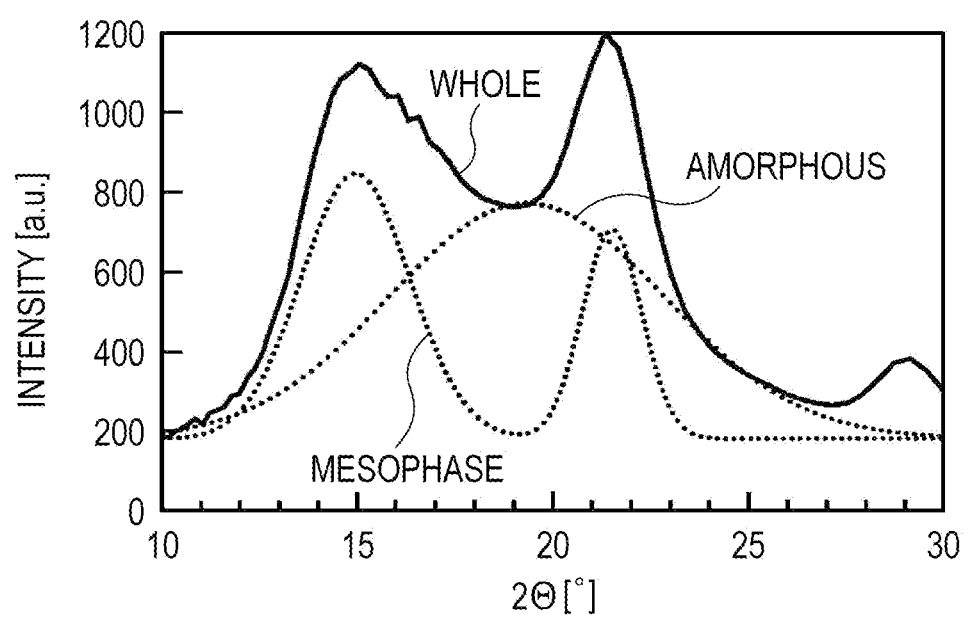
FIG. 26 is a graph indicating the results of wide-angle X-ray diffraction measurement on a sample after a room-temperature stretching step in Comparative Example 3, in which a crystalline (α crystals) phase, an amorphous phase, and a mesophase are separated.

FIG. 26 indicates the results of wide-angle X-ray diffraction measurement on the sample after the room-temperature stretching step in which a crystalline (α crystals) phase, an amorphous phase, and a mesophase are separated. FIG. 26 indicates that the sample after the room-temperature stretching step is constituted by 0% crystalline phase (α crystals), 61% amorphous phase, and 39% mesophase.

Figure 27:
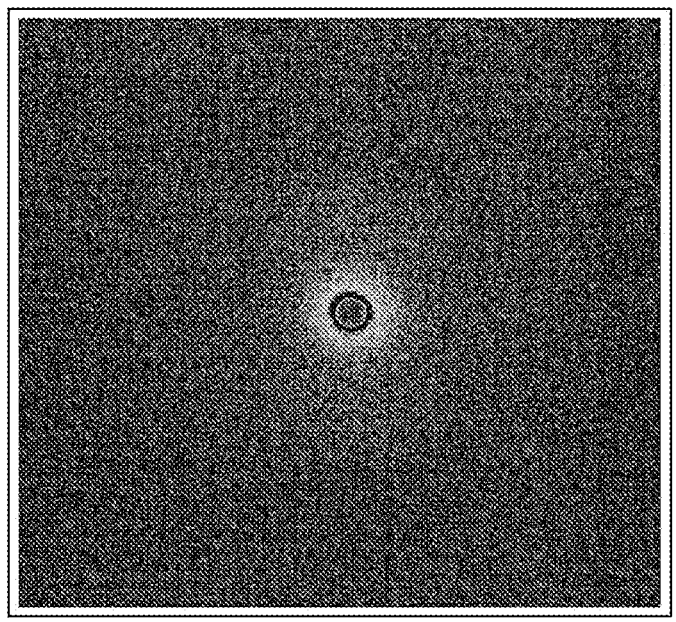
FIG. 27 is an image showing the results of SAXS measurement on a sample after the room-temperature stretching step in Comparative Example 3.
Figure 28:
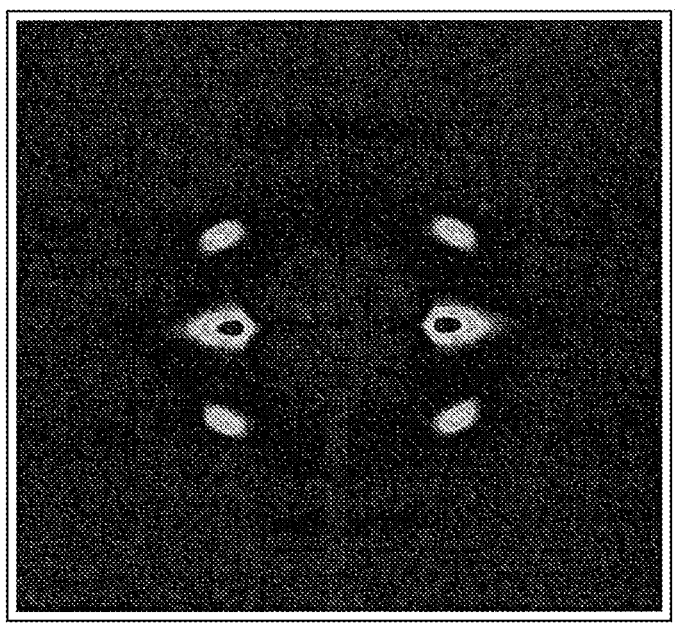
FIG. 28 is an image showing the results of wide-angle X-ray diffraction measurement on a sample after the room-temperature stretching step in Comparative Example 3.

FIGS. 27 and 28 respectively show the results of SAXS measurement and wide-angle X-ray diffraction measurement on a sample after the room-temperature stretching step. The SAXS image in FIG. 27 indicates that the long period is as small as 9.24 nm and that the refinement of crystals occurred in the sample. However, when the azimuth angular distribution was calculated from the wide-angle X-ray diffraction image in FIG. 28, it was found that the half width of the orientation peak was 6.78° and that the sample did not have sufficient orientation.

Comparative Example 4

This comparative example differs from Comparative Example 3 in that, in the room-temperature stretching step, room-temperature stretching was conducted until the chuck-to-chuck distance was two times greater than the initial distance (in other words, 20 mm).

Figure 29:
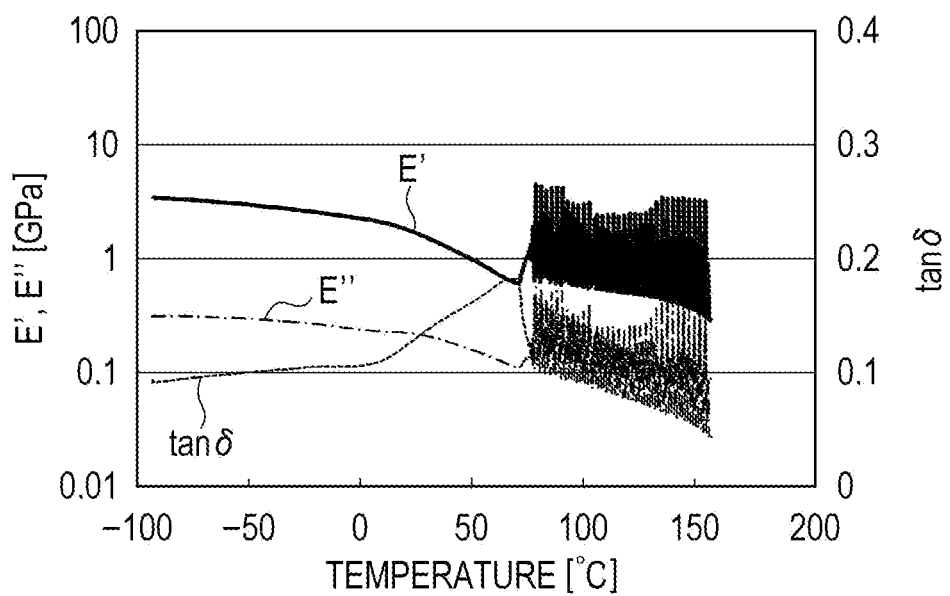
FIG. 29 is a graph indicating the results of dynamic viscoelasticity analysis at a frequency of 10 Hz and a heatup rate of 2° C./min on a sample after a room-temperature stretching step in Comparative Example 4.

FIG. 29 indicates the results of dynamic viscoelasticity analysis at a frequency of 10 Hz and a heatup rate of 2° C./min on a sample after the room-temperature stretching step. As indicated in FIG. 29, the loss modulus E" monotonically decreases with the increase in temperature in the range of 0° C. to 50° C.

Comparative Example 5

This comparative example differs from Comparative Example 3 in that the following heat treatment step was conducted after the room-temperature stretching step.
  Heat Treatment Step:
  While retaining the chuck-to-chuck distance at 40 mm after the room-temperature stretching step, the temperature inside the stretching machine was elevated to 100° C. and a heat treatment was conducted for 30 minutes.

A dumbbell-shaped sample was punched out from the sample after the heat treatment step and a stress-strain curve was measured with a tension testing machine. As a result, the sample was found to have low strength, namely, a rupture stress of 127 MPa and a tensile elastic modulus of 1.6 GPa.

Figure 30:
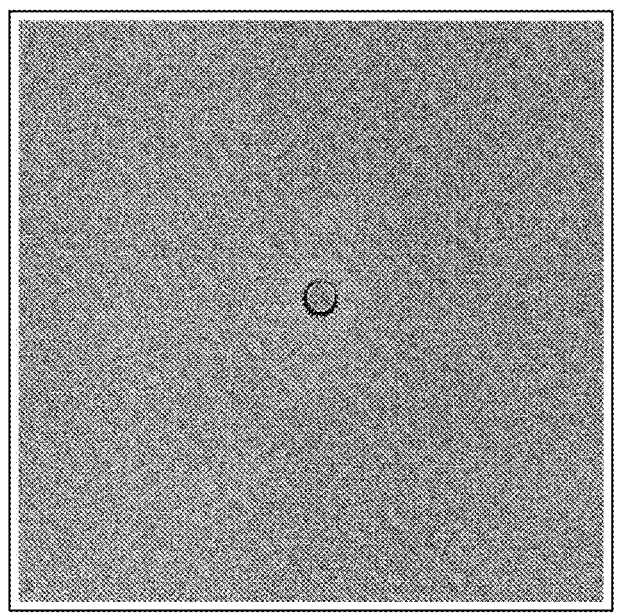
FIG. 30 is an image showing the results of SAXS measurement on a sample after a heat treatment step in Comparative Example 5.
Figure 31:
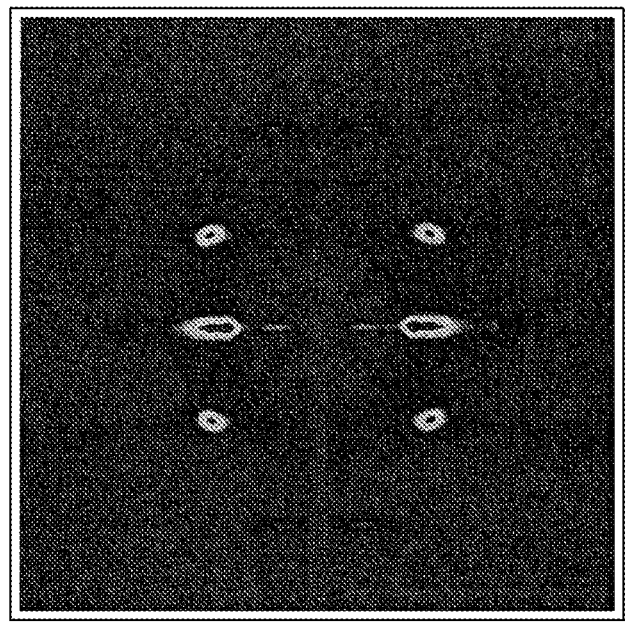
FIG. 31 is an image showing the results of wide-angle X-ray diffraction measurement on a sample after the heat treatment step in Comparative Example 5.

FIGS. 30 and 31 respectively show the results of SAXS measurement and wide-angle X-ray diffraction measurement on a sample after the heat treatment step. The SAXS image in FIG. 30 indicates that the long period is small and that the refinement of crystals occurred in the sample. However, when the azimuth angular distribution was calculated from the wide-angle X-ray diffraction image in FIG. 31, it was found that the half width of the orientation peak was large and that the sample did not have sufficient orientation.

Figure 32:
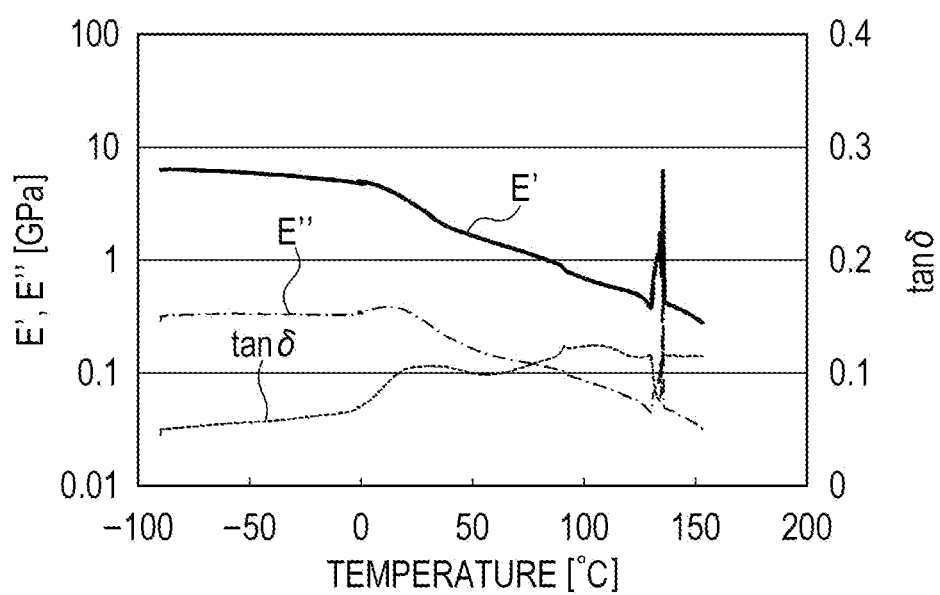
FIG. 32 is a graph indicating the results of dynamic viscoelasticity analysis at a frequency of 10 Hz and a heatup rate of 2° C./min on a sample after the heat treatment step in Comparative Example 5.

FIG. 32 indicates the results of dynamic viscoelasticity analysis at a frequency of 10 Hz and a heatup rate of 2° C./min on a sample after the heat treatment step. As indicated in FIG. 32, both the storage elastic modulus E' and the loss modulus E" monotonically decreased with the increase in temperature from 0° C.

Comparative Example 6

This comparative example differs from Comparative Example 5 in that, in the heat treatment step, the temperature inside the stretching machine was increased to 130° C.

A dumbbell-shaped sample was punched out from the sample after the heat treatment step and a stress-strain curve was measured with a tension testing machine. As a result, the sample was found to have low strength, namely, a rupture stress of 180 MPa and a tensile elastic modulus of 2.2 GPa.

Figure 33:
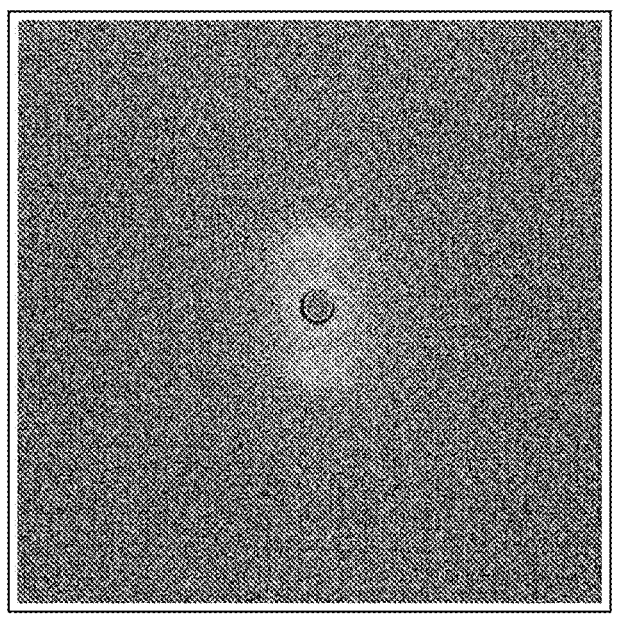
FIG. 33 is an image showing the results of SAXS measurement on a sample after a heat treatment step in Comparative Example 6.
Figure 34:
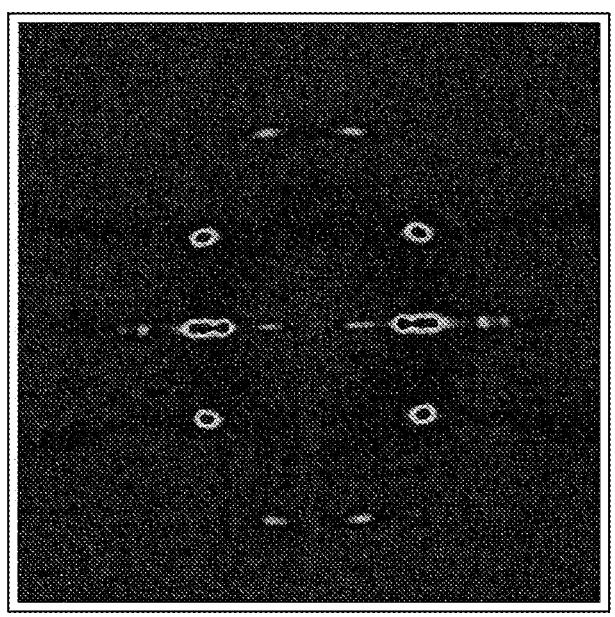
FIG. 34 is an image showing the results of wide-angle X-ray diffraction measurement on a sample after the heat treatment step in Comparative Example 6.

FIGS. 33 and 34 respectively show the results of SAXS measurement and wide-angle X-ray diffraction measurement on a sample after the heat treatment step. The SAXS image in FIG. 33 indicates that the long period is larger than in Comparative Example 3 and that the refinement of crystals did not sufficiently occur in the sample. The azimuth angular distribution was calculated from the wide-angle X-ray diffraction image in FIG. 34 and it was found that the half width of the orientation peak was large and that the sample did not have sufficient orientation.

Comparative Example 7

This comparative example differs from Comparative Example 5 in that, in the heat treatment step, the temperature inside the stretching machine was increased to 160° C. and the heat treatment was conducted for 1.5 minutes.

A dumbbell-shaped sample was punched out from the sample after the heat treatment step and a stress-strain curve was measured with a tension testing machine. As a result, the sample was found to have low strength, namely, a rupture stress of 145 MPa and a tensile elastic modulus of 1.6 GPa.

Figure 35:
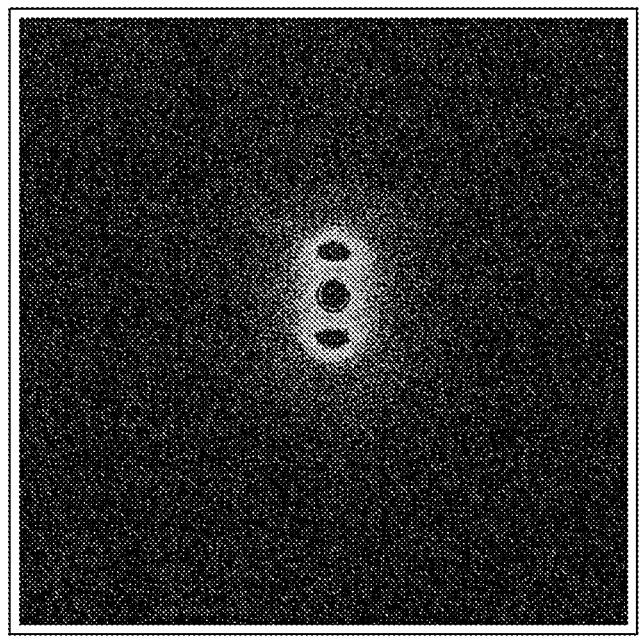
FIG. 35 is an image showing the results of SAXS measurement on a sample after a heat treatment step in Comparative Example 7.

FIG. 35 indicates the results of SAXS measurement on a sample after the heat treatment. The SAXS image in FIG. 35 indicates that the long period is larger than in Comparative Example 3 and that the sample did not undergo sufficient crystal refinement.

Comparative Example 8

This comparative example differs from Comparative Example 2 in that the following heat rolling step was conducted after the cooling step.
  Heat Rolling Step:
  The sample after the cooling step was interposed between two polyimide films and heated on a 160° C. hot plate. The sample as interposed between the polyimide films was inserted between rollers at a temperature of 165° C. in a rolling machine. The rollers were rotated in directions opposite to each other at a rotation rate of 600 rpm to conduct heat rolling.

A dumbbell-shaped sample was punched out from the sample after the heat rolling step and a stress-strain curve was measured with a tension testing machine. As a result, the sample was found to have low strength, namely, a rupture stress of 86 MPa and a tensile elastic modulus of 1.6 GPa.

Figure 36:
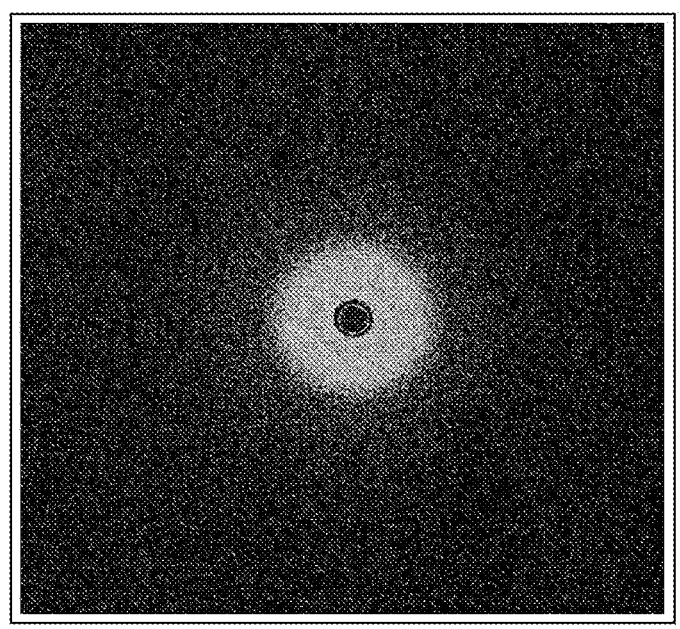
FIG. 36 is an image showing the results of SAXS measurement on a sample after heating (before rolling) in a heat rolling step in Comparative Example 8.
Figure 37:
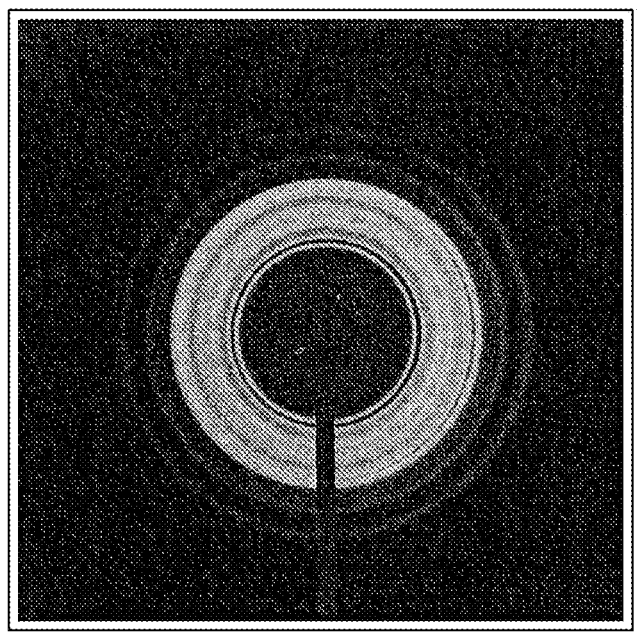
FIG. 37 is an image showing the results of wide-angle X-ray diffraction measurement on a sample after heating (before rolling) in the heat rolling step in Comparative Example 8.

FIGS. 36 and 37 respectively show the results of SAXS measurement and wide-angle X-ray diffraction measurement on a sample after heating (before rolling) in the heat rolling step. The SAXS image in FIG. 36 indicates that the long period is larger than in Comparative Example 2 and that sufficient refinement of crystals did not occur in the sample. The wide-angle X-ray diffraction image in FIG. 37 found that the sample had no orientation.

Figure 38:
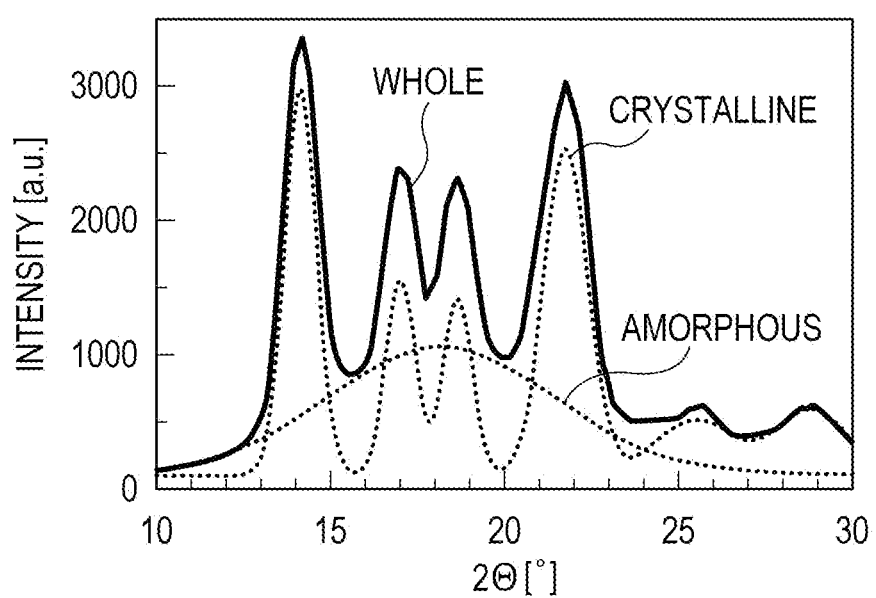
FIG. 38 is a graph showing the results of wide-angle X-ray diffraction measurement on a sample after the heat rolling step in Comparative Example 8, in which a crystalline (a crystals) phase, an amorphous phase, and a mesophase are separated.

FIG. 38 indicates the results of the wide-angle X-ray diffraction measurement on the sample after the heat rolling step, in which a crystalline (α crystals) phase, an amorphous phase, and a mesophase are separated. FIG. 38 indicates that the sample after the heat rolling step was constituted by 62% crystalline phase (α crystals), 38% amorphous phase, and 0% mesophase.

Figure 39:
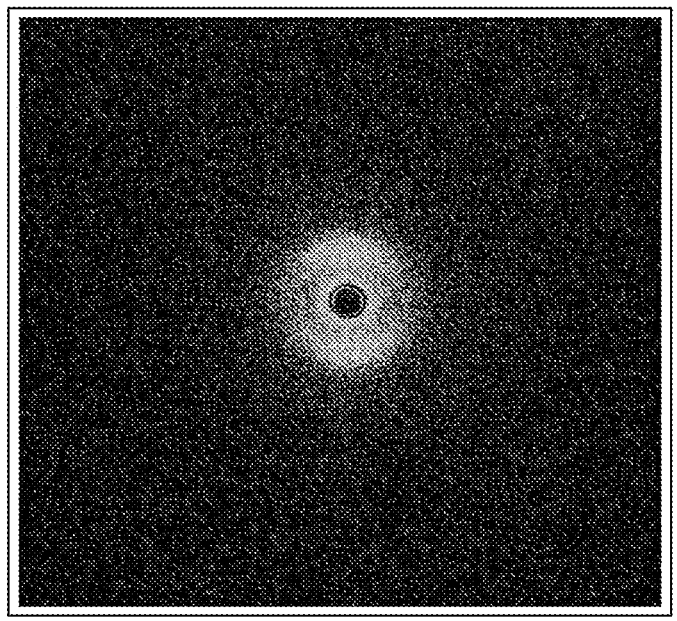
FIG. 39 is an image showing the results of SAXS measurement on a sample after the heat rolling step in Comparative Example 8.
Figure 40:
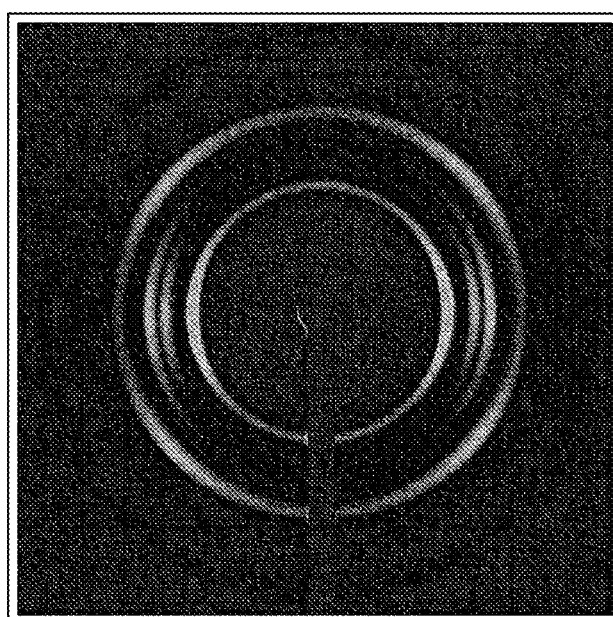
FIG. 40 is an image showing the results of wide-angle X-ray diffraction measurement on a sample after the heat rolling step in Comparative Example 8.

FIGS. 39 and 40 respectively show the results of SAXS measurement and wide-angle X-ray diffraction measurement on a sample after the heat rolling step. The SAXS image in FIG. 39 indicates that the long period is larger than in Comparative Example 2 and that sufficient refinement of crystals did not occur in the sample. The wide-angle X-ray diffraction image in FIG. 40 found that the sample had no orientation.

Comparative Example 9

This comparative example differs from Comparative Example 8 in that the following heat stretching step was conducted after the heat rolling step.

Heat Stretching Step:

A strip of sheet was cut from the sample after the heat rolling step and the sheet was retained in a stretching machine at a chuck-to-chuck distance of 10 mm. The temperature inside the stretching machine was elevated to 130° C. and heat stretching was conducted at a stretching rate of 100 mm/min until the chuck-to-chuck distance was three times greater than the initial distance (in other words, 30 mm).

A dumbbell-shaped sample was punched out from the sample after the heat rolling step and a stress-strain curve was measured with a tension testing machine. As a result, the sample was found to have low strength, namely, a rupture stress of 265 MPa and a tensile elastic modulus of 3.5 GPa.

Comparative Example 10

This comparative example differs from Comparative Example 2 in that the following heat stretching step was conducted after the cooling step.

Heat Stretching Step:

A strip of sheet was cut from the sample after the cooling step and the sheet was retained in a stretching machine at a chuck-to-chuck distance of 10 mm. The temperature inside the stretching machine was elevated to 100° C. and heat stretching was conducted at a stretching rate of 100 mm/min until the chuck-to-chuck distance was two times greater than the initial distance (in other words, 20 mm).

A dumbbell-shaped sample was punched out from the sample after the heat stretching step and a stress-strain curve was measured with a tension testing machine. As a result, the sample was found to have low strength, namely, a rupture stress of 101 MPa.

Comparative Example 11

This comparative example differs from Comparative Example 10 in that, in the heat stretching step, the temperature inside the stretching machine was elevated to 80° C.

A dumbbell-shaped sample was punched out from the sample after the heat stretching step and a stress-strain curve was measured with a tension testing machine. As a result, the sample was found to have low strength, namely, a rupture stress of 108 MPa.

Comparative Example 12

This comparative example differs from Comparative Example 10 in that, in the heat stretching step, the temperature inside the stretching machine was elevated to 120° C.

A dumbbell-shaped sample was punched out from the sample after the heat stretching step and a stress-strain curve was measured with a tension testing machine. As a result, the sample was found to have low strength, namely, a rupture stress of 97 MPa.

Comparative Example 13

This comparative example differs from Comparative Example 10 in that, in the heat stretching step, the temperature inside the stretching machine was elevated to 130° C.

A dumbbell-shaped sample was punched out from the sample after the heat stretching step and a stress-strain curve was measured with a tension testing machine. As a result, the sample was found to have low strength, namely, a rupture stress of 94 MPa.

Comparative Example 14

This comparative example differs from Comparative Example 10 in that, in the heat stretching step, the temperature inside the stretching machine was elevated to 140° C.

A dumbbell-shaped sample was punched out from the sample after the heat stretching step and a stress-strain curve was measured with a tension testing machine. As a result, the sample was found to have low strength, namely, a rupture stress of 92 MPa.

Comparative Example 15

This comparative example differs from Comparative Example 10 in that, in the heat stretching step, heat stretching was conducted until the chuck-to-chuck distance was four times greater than the initial distance (in other words, 40 mm).

A dumbbell-shaped sample was punched out from the sample after the heat stretching step and a stress-strain curve was measured with a tension testing machine. As a result, the sample was found to have low strength, namely, a rupture stress of 173 MPa.

Comparative Example 16

This comparative example differs from Comparative Example 10 in that, in the heat stretching step, heat stretching was conducted until the chuck-to-chuck distance was five times greater than the initial distance (in other words, 50 mm).

A dumbbell-shaped sample was punched out from the sample after the heat stretching step and a stress-strain curve was measured with a tension testing machine. As a result, the sample was found to have low strength, namely, a rupture stress of 83 MPa and a tensile elastic modulus of 1.2 GPa.

Comparative Example 17

This comparative example differs from Comparative Example 10 in that, in the heat stretching step, the temperature inside the stretching machine was elevated to 120° C.

A dumbbell-shaped sample was punched out from the sample after the heat stretching step and a stress-strain curve was measured with a tension testing machine. As a result, the sample was found to have low strength, namely, a rupture stress of 102 MPa and a tensile elastic modulus of 1.1 GPa.

Comparative Example 18

This comparative example differs from Comparative Example 10 in that, in the heat stretching step, the temperature inside the stretching machine was elevated to 140° C.

A dumbbell-shaped sample was punched out from the sample after the heat stretching step and a stress-strain curve was measured with a tension testing machine. As a result, the sample was found to have low strength, namely, a rupture stress of 124 MPa and a tensile elastic modulus of 1.3 GPa.

Comparing Examples 1 to 16 to Comparative Examples 1 to 18 illustrates that a polypropylene molded article according to an embodiment of this disclosure has mechanical strength superior to that of related art.

It should be noted that the crystallinity degree obtained by wide-angle X-ray diffraction measurement, the half width of the orientation peak in an azimuth angular distribution obtained by wide-angle X-ray diffraction measurement, and the long period obtained by SAXS measurement may be any as long as they are 48% or more, 5.5° or less, and 12 nm or more and 16 nm or less, respectively and are not limited to the values of Examples 1 to 16.

As a result, mechanical strength (300 MPa or more in terms of rupture strength) which could not have been achieved in the related art can be achieved. There is no upper limit for the rupture strength. According to the examples of the manufacturing method, the rupture strength is typically 500 MPa or less. The upper limit of the crystallinity degree obtained by the wide-angle X-ray diffraction measurement on a polypropylene molded article is also not limited. The crystallinity degree obtained by the wide-angle X-ray diffraction measurement may be 68% or less considering that the crystallinity degree need not be as high as that required for the polypropylene molded articles disclosed in Patent Literatures described above.

According to an embodiment of this disclosure, a polypropylene molded article having mechanical strength superior that in the related art can be provided. Since material properties of a commodity plastic polypropylene can be improved by the embodiment of the disclosure, a polypropylene can be used as an alternative for engineering plastics or metal materials. Thus, the production costs of various industrial products made of engineering plastics and metals and household products can be significantly reduced. If the disclosure is applied to moving bodies such as automobiles, significant energy conservation can be realized due to weight reduction.

What is claimed is:

1. A polypropylene molded article, wherein
   a crystallinity degree obtained by wide-angle X-ray diffraction measurement is 48% or more,
   a half width of an orientation peak in an azimuth angular distribution obtained by wide-angle X-ray diffraction measurement is 5.5° or less, and
   a long period obtained by small-angle X-ray scattering measurement is 12 nm or more and 16 nm or less.

2. The polypropylene molded article according to claim 1, wherein a storage elastic modulus obtained by dynamic viscoelasticity analysis at a frequency of 10 Hz and a heatup rate of 2° C./min is larger at 120° C. than at 50° C.

3. The polypropylene molded article according to claim 1, wherein a loss modulus obtained by dynamic viscoelasticity analysis at a frequency of 10 Hz and a heatup rate of 2° C./min monotonically increases with an increase in temperature in a range of 0° C. to 50° C.

4. The polypropylene molded article according to claim 1, wherein a tensile elastic modulus is 4.0 GPa or more.

5. A method for manufacturing the polypropylene molded article according to claim 1, the method comprising:
   a heating step of heating a polypropylene to a temperature of 200° C. or higher and 220° C. or lower to prepare a melt;
   a cooling step of quenching the melt of the polypropylene to 25° C. or less to form a mesophase in the polypropylene;
   a room-temperature stretching step of stretching the polypropylene that includes the mesophase at room temperature by a stretching ratio of 2 or more and 5 or less; and
   a heat stretching step of further stretching the stretched polypropylene obtained in the room-temperature stretching step by a stretching ratio of 2 or more and 5 or less in a temperature range of 100° C. or higher and 140° C. or lower.

6. A method for manufacturing the polypropylene molded article according to claim 1, the method comprising:
   a heating step of heating a polypropylene to a temperature of 200° C. or higher and 220° C. or lower to prepare a melt;
   a cooling step of quenching the melt of the polypropylene to 25° C. or less to form a mesophase in the polypropylene;
   a heat rolling step of rolling the polypropylene that includes the mesophase while heating the polypropylene to a temperature near an endothermic peak obtained by differential scanning calorimeter analysis; and
   a heat stretching step of stretching the roiled polypropylene obtained in the heat rolling step by a stretching ratio of 4 or more and 6 or less in a temperature range of 120° C. or higher and 140° C. or lower.

* * * * *